US008617901B2

(12) United States Patent
Ouerdane et al.

(10) Patent No.: US 8,617,901 B2
(45) Date of Patent: Dec. 31, 2013

(54) METHOD OF MULTIPLE SPIKING ISOTOPE DILUTION MASS SPECTROMETRY

(75) Inventors: Laurent Ouerdane, Lagor (FR); Juris Meija, Ottawa (CA); Zoltan Mester, Ottawa (CA)

(73) Assignee: National Research Council of Canada

( * ) Notice: Subject to any disclaimer, the term of this patent is extended or adjusted under 35 U.S.C. 154(b) by 239 days.

(21) Appl. No.: 13/129,479

(22) PCT Filed: Nov. 18, 2009

(86) PCT No.: PCT/CA2009/001668

§ 371 (c)(1), (2), (4) Date: Aug. 30, 2011

(87) PCT Pub. No.: WO2010/057305

PCT Pub. Date: May 27, 2010

(65) Prior Publication Data

US 2011/0306147 A1 Dec. 15, 2011

Related U.S. Application Data

(60) Provisional application No. 60/199,647, filed on Nov. 19, 2008.

(51) Int. Cl.
*G01N 24/00* (2006.01)

(52) U.S. Cl.
USPC ................. 436/173; 436/56; 436/73; 436/74; 436/83; 436/161; 436/179

(58) Field of Classification Search
None
See application file for complete search history.

(56) References Cited

U.S. PATENT DOCUMENTS 5,414,259 A 5/1995 Kingston
6,790,673 B1 9/2004 Kingston

OTHER PUBLICATIONS

International Search Report and Written Opinion on PCT/CA2009/001668 dated Feb. 23, 2010.
Albert R, Horwitz W. (1997) Analytical Chemistry. 69: 789-790.
Bijlsma S, Boelens HFM, Hoefsloot HCJ, Smilde AK. (2000) Analytica Chimica Acta. 419: 197-207.
Boyd RK. (1977) Chem. Rev. 77: 93.
Branson H. (1947) Science. 106: 404-404.
Brauman JI. (1966) Analytical Chemistry. 38: 607-610.
De Bievre P, Debus GH. (1965) Nuclear Instruments and Methods. 32: 224-228.
Di HJ, Cameron KC, McLaren RG. (2000) Aust. J. Soil Res. 38: 213-230.

(Continued)

*Primary Examiner* — Robert Xu
(74) *Attorney, Agent, or Firm* — Jason Davis

(57) ABSTRACT

A comprehensive approach for interpretation of the multiple spiking isotope dilution results is described herein. It has now been found that a method of multiple spiking isotope dilution analysis for mass spectrometry is possible using an approach that permits precise and simultaneous characterization of m substances from a sample even if species inter-conversion (degradation and formation) has occurred prior to separation. Advantageously, initial and final amounts of involved analytes, conversion extent, conversion degree and rate constants from the results of a single quantitation experiment may be obtained with the present method. In a particularly advantageous embodiment, uncertainty in the characterization of the substances may be estimated more accurately by also estimating increase in the uncertainty due to inter-conversion of the analytes.

12 Claims, 4 Drawing Sheets

(56) References Cited

OTHER PUBLICATIONS

Eckley CS, Hintelmann H. (2006) Sci. Tot. Environ. 368: 213-230.
Federal Register. (2008) 73: 486-489.
Gonfiantini R, Valkiers S, Taylor PDP, De Bievre P. (1997) International Journal of Mass Spectrometry and Ion Processes. 161: 15-26.
Neumann KG, Gallus SM, Radlinger G, Vogl J. (1998) Spectrochimica Acta Part B—Atomic Spectroscopy. 53: 273-287.
Hintelmann H, Evans RD, Villeneuve JY. (1995) J. Anal. At. Spectrom. 10: 619.
Hintelmann H, Falter R, Ilgen G, Evans RD. (1997) Fres. J. Anal. Chem. 358: 363-370.
Hintelmann H. (1999) Chemosphere. 39: 1093.
Hoelzl R, Hoelzl C, Kotz C, Fabry L. (1998) Accreditation and Quality Assurance. 3: 185-188.
Horwitz W. (1982) Analytical Chemistry. 54: 67A-76A.
Jennings MEI, Matthews DE. (2005) Analytical Chemistry. 77: 6435-6444.
Jereb V, Horvat M, Drobne D, Pihlar B. (2003) Sci. Tot. Environ. 304: 269.
Kingston HM, Huo D, Lu Y, Chalk S. (1998) Spectrochim. Acta B. 53: 299-309.
Kragten J. (1994) The Analyst. 119: 2161-2165.
Laidler KJ. (1996) Pure Appl. Chem. 68: 149.
Lambertsson L, Lundberg E, Nilsson M, Frech W. (2001) J. Anal. At. Spectrom. 16: 1296.
Meija J, Caruso JA. (2004) Journal of the American Society for Mass Spectrometry. 15: 654-658.
Meija J, Centineo G, Garcia Alonso JI, Sanz-Medel A, Caruso JA. (2005) Journal of Mass Spectrometry. 40: 807-814.
Meija J, Yang L, Caruso JA, Mester Z. (2006a) J. Anal. At. Spectrom. 21: 1294-1297.
Meija J, Mester Z, D'Ulivo A. (2006b) Journal of the American Society for Mass Spectrometry. 17: 1028-1036.
Meija J, Mester Z. (2007) Spectrochimica Acta B. 62: 1278-1284.
Meija J, Mester Z. (2008a) Anal. Chim. Acta. 607: 115-125.
Meija J, Mester Z. (2008b) Metrologia. 45: 53-62.
Meija J, Ouerdane L, Mester Z. (2009) Analyst. 134: 466-471.
Monperrus M, Tessier E, Amouroux D, Leynaert A, Huonnic P, Donard OFX. (2007) Mar. Chem., 107: 49-63.
Monperrus M, Rodriguez-González P, Amouroux D, Garcia Alonso JI, Donard OFX. (2008) Anal. Bioanal. Chem. 390: 655-666.
Patterson KY, Veillon C, O'Haver TC. (1994) Analytical Chemistry. 66 : 2829-2834.
Point D, Davis WC, Garcia Alonso JI, Monperrus M, Christopher SJ, Donard OFX, Becker PR, Wise SA. (2007) Anal. Bioanal. Chem. 389: 787-798.
Point D, Garcia Alonso JI, Davis WC, Christopher SJ, Guichard A, Donard OFX, Becker PR, Turk GC, Wise SA. (2008) J. Anal. At. Spectrom. 23: 385.
Qvarnström J, Frech W. (2002) J. Anal. At. Spectrom. 17: 1486.
Rahman GMM, Kingston HM. (2004) Anal. Chem. 76: 3548.
Rodriguez-Castrillón JÁ, Moldovan M, Ruiz Encinar J, Garcia Alonso JI. (2008) Journal of Analytical Atomic Spectrometry. 23: 318-324.
Rodriguez-González P, Ruiz Encinar J, Garcia Alonso JI, Sanz-Medel A. (2004) J. Anal. At. Spectrom. 19: 685-691.
Rodriguez-González P, Ruiz Encinar J, Garcia Alonso JI, Sanz-Medel A. (2005a) Anal. Bioanal. Chem. 381: 380.
Rodriguez-González P, Marchante-Gayón JM, Garcia Alonso JI, Sanz-Medel A. (2005b) Spectrochimica Acta B. 60: 151-207.
Rodriguez-González P, Garcia Alonso JI, Sanz-Medel A. (2005c) Journal of Analytical Atomic Spectrometry. 20: 1076-1084.
Rodriguez-González P, Monperrus M, Garcia Alonso JI, Amouroux S, Donard OFX. (2007) J. Anal. At. Spectrom. 11: 1373-1382.
Rodriguez Martin-Doimeadios RC, Monperrus M, Krupp E, Amouroux D, Donard OF. (2003) Analytical Chemistry. 75: 3202-3211.
Rodriguez Martin-Doimeadios RC, Tessier E, Amouroux D, Guyoneaud R, Duran R, Caumette P, Donard OFX. (2004) Mar. Chem. 90: 107.
Ruiz Encinar J, Rodriguez-González P, Garcia Alonso JI, Sanz-Medel A. (2002) Analytical Chemistry. 74: 270-281.
Schwartz LM. (1975) Analytical Chemistry. 47: 963-964.
Tirez K, Brusten W, Cluyts A, Patyn J, De Brucker N. (2003) Journal of Analytical Atomic Spectrometry. 18: 922-932.
USEPA. (2007) 'Method 6800: Elemental and Speciated Isotope Dilution Mass Spectrometry'.
Van DN, Bui TTX, Tesfalidet S. (2008) Analytical and Bioanalytical Chemistry. online. (Anal Bioanal Chem (2008) 392:737-747).
Welch SA, Beard BL, Johnson CM, Braterman PS. (2003) Geochimica et Cosmochimica Acta. 67: 4231-4250.
Yang L, Ciceri E, Mester Z, Sturgeon RE. (2006) Analytical and Bioanalytical Chemistry. 386: 1673-1680.
Yang L, Sturgeon RE. (2008) Analytical and Bioanalytical Chemistry. online. (Anal Bioanal Chem (2009) 393:377-385).

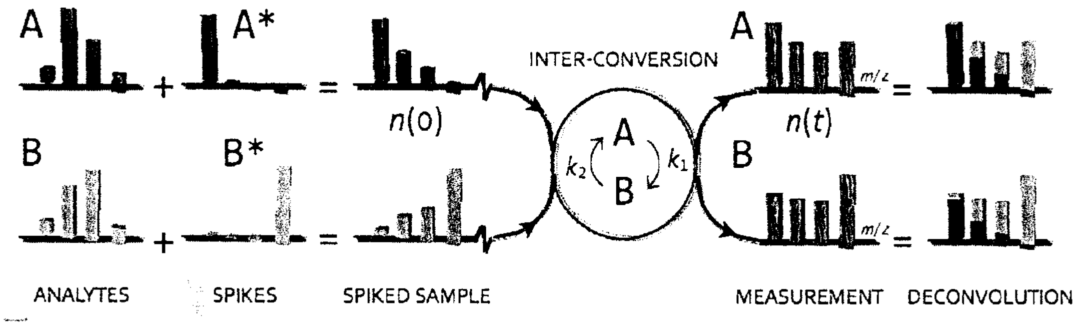

Fig. 3

(PSEUDO)-ELEMENTAL MASS SPECTRA *of*

[Eq. 28] a) RESULTING SUBSTANCES, R
b) PURE ENRICHED SPIKES, X

Deconvolution $\mathbf{A = X^{-1}R}$ *or* $\mathbf{A = (X^TX)^{-1}X^TR}$

[Eq. 30,38] $n_{0,i}$ initial amount of substances

[Eq. 36] $F_{i\to j}$ (mathematical) correction factors

[Eq. 37] $n_i^\dagger$ degradation uncorrected amount of substances (hypothetical)

[Eq. 42] $\alpha_{i\to j}$ degree of inter-conversion reactions

[Eq. 44] $n_i(t)$ amount of substances at given time

[Eq. 45-47] $k_{i\to j}$ inter-conversion rate constants via non-linear fitting

[Eq. 48] $\xi_{i\to j}$ extent of inter-conversion reactions

Fig. 4

METHOD OF MULTIPLE SPIKING ISOTOPE DILUTION MASS SPECTROMETRY

CROSS-REFERENCE TO RELATED APPLICATIONS

This application is a national phase entry of International Patent Application PCT/CA2009/001668 filed Nov. 18, 2009 and claims the benefit of U.S. Provisional Patent Application Ser. No. 61/199,647 filed Nov. 19, 2008, the entire contents of both of which are herein incorporated by reference.

FIELD OF THE INVENTION

The present invention relates to mass spectrometry, in particular to a method of multiple spiking isotope dilution mass spectrometry.

BACKGROUND OF THE INVENTION

Quantitation in analytical chemistry is usually achieved using external calibration. In the presence of matrix interferences, however, the method of internal calibration is used to reduce or eliminate the various sources of errors. Two strategies are available to achieve this: method of standard additions and method of internal standard. The former rests on building the calibration curve within the sample. With all its benefits, standard additions rely on signal intensity measurements and as such, are prone to instrumental drifts and variations in analyte recovery during extraction or separation. To reduce the measurement uncertainty due to instrumental drifts and analyte recoveries, ratio methods are used where all signals are normalized to the internal standard. Isotope dilution is a combination of these two methods utilizing an isotopically labeled internal standard with known amounts. One other difference, however, remains—internal calibration methods provide with the amount of analyte at the time of spike addition whereas external calibration methods yield the amount of analyte at the time of analysis. Therefore, if one is interested in the amount of analyte at the time of analysis using isotope dilution, it must be deduced mathematically or additional spiking experiments need to be carried out as in post-column spiking [Heumann 1998; Meija 2008a]. While majority of analysis are concerned with the amount of analyte at the time of sampling, it is useful to determine the amount of analyte at the time of analysis to judge the quality of analytical methods.

Biologists and sociologists almost always face the question of how to estimate the size of a population known to exist without being able to sample the population entirely. Further, it is rather challenging to account for changes in population size during the analysis. In biology this occurs as birth or death of animals and in chemistry as the loss or the formation of the analyte during the sample analysis. Addition of not just one but multiple spikes of known amounts efficiently solves the problem of quantifying inter-converting analytes [Kingston 1995; Kingston 1998]. In essence, when substances B and C, for example, are known to produce analyte A after addition of isotopically enriched A to the sample, accurate initial amount of substance A can be obtained only when known amounts of enriched substances B and C are also added (hence, multiple-spiking isotope dilution) and all three substances A, B, C can be then measured. The measurand in isotope dilution is the amount of substance (at the time of spiking) and the measured quantity is the isotope pattern of analyte(s), more specifically, isotope ratios. Isotope dilution has been practiced for a long time, initially using radioactive isotopes of lead as) spikes (tracers).

Multiple spiking isotope dilution methods are not uncommon in analytical chemistry, yet the uptake of this advanced calibration approach is slow due to the complexity of the mathematical equations. Currently, several mathematical strategies exist to address simultaneous species formation and degradation using multiple spiking isotope dilution mass spectrometry. Numerous examples of published literature reveal equations that fill entire pages for two or three component systems and the reader is still left without the explicit expressions for the estimates of the measurand [Ruiz Encinar 2002; Point 2007; Monperrus 2008; Van 2008; Rodríguez-González 2004; Tirez 2003]. Such complexity is unwarranted and impedes development of ingenious applications of isotope dilution.

While many of these strategies have been compared numerically, conceptual comparison of the underlying principles is lacking. Due to the recent interest in using the species inter-conversion factors, mainly to study the quality of analytical methods, a review of the mathematical logic and inconsistencies of the existing double or triple spiking isotope dilution models is useful before providing a new model for multiple spiking isotope dilution mass spectrometry. Further, it is useful to provide systematic concepts to clarify the species inter-conversion coefficient definitions currently lacking in elemental speciation.

The application of species-specific isotope dilution has a long history, dating back to as far as 1934, yet all the quantitation applications of this technique traditionally rested entirely on a single salient feature of this technique—the ability to correct for species degradation during the sample analysis. It was not until the mid-1990's when the opposite process, analyte formation during the analysis, received serious attention. Kingston et al. showed first in 1994 that, while conventional isotope dilution methods do correct for species degradation, they are ineffective against the bias introduced from the formation of analyte during the analysis. The potential for the formation of analyte during the analysis is now a widely acknowledged in analytical chemistry. It is observed, for example, during the analysis of Cr(VI) in the presence of Cr(III) [Meija 2006a] or $MeHg^+$ in the presence of Hg(II) [Hintelmann 1997]. To address these challenges and obtain unbiased estimates of Cr(VI) or $MeHg^+$ concentration, the basic equations of isotope dilution have to be adjusted to correct for the possible analyte formation [Meija 2008a]. Several mathematical strategies now exist to address the analyte formation and degradation using isotope dilution. Recently Rodríguez-González et al. compared the numerical performance of the four existing approaches for multiple spiking species-specific isotope dilution analysis using butyltin determination in sediments as an example [Rodríguez-González 2007]. While all of these strategies have been shown to give identical numerical results for the initial amount of substances in the sample, the coefficients that describe the inter-conversion differ. Such differences are solely due to the unrealized inconsistencies in current isotope dilution equations, which are discussed below.

To describe species transformation during the analysis, many analytical chemists have long ailed—what matters is what something is, not what it is called [Dumon 1993]. As a result, to describe the formation of $CH_3Hg^+$ from Hg(II) there are a gamut of vague terms, such as "specific methylation" [Hintelmann 1997], "accidental formation rate" [Hintelmann 1999], "specific rate of methylation" [Hintelmann 1995], "degree of methylation" [Qvarnström 2002], "methylation yield" [Point 2007], "methylation rate" [Lambertsson 2001]

and "methylation activity" [Eckley 2006], just to name few. As an example, one can find four different synonyms (methylation factor, yield, rate and intensity) for a single dimensionless variable used to quantify the methylation of Hg(II) in a recent report [Point 2008]. One cannot but wonder about the precise meaning of these variables.

The variables that quantify the analyte formation are increasingly used by chemists to evaluate analytical protocols. As a result, species inter-conversion coefficients have been used in recent years along with the degradation-corrected amount of analytes. For example, U.S. Environmental Protection Agency has recommended that isotope dilution results be discarded when the values of the inter-conversion coefficients exceed certain threshold [USEPA 1998]. Further to the frivolous naming conventions, it turns out that definitions of these coefficients remain murky at best despite the volume of recent studies that rest on the numerical values aimed at quantification of the analyte inter-conversion [Point 2007; Point 2008; Monperrus 2008].

In order to fully grasp the intricacies of the isotope dilution for inter-converting species, the basic building principle of isotope dilution equations are reviewed herein. For a closed two component system, the amount balance of both analytes before ($n_{A,B}^0$) and after ($n_{A,B}$) the conversion can be generalized in the form of the following two expressions using amount transfer coefficients, $k_i$:

$$n_A = n_A^0 \cdot k_1 + n_B^0 \cdot k_2 \quad [1]$$

$$n_B = n_A^0 \cdot k_3 + n_B^0 \cdot k_4 \quad [2]$$

As an example, equations developed by Kingston et al. [Kingston 1998] (and Meija et al. [Meija 2006a]) for the inter-conversion of two species take the following form:

$$n_A = n_A^0 \cdot (1-\alpha_1) + n_B^0 \cdot \alpha_2 \quad [3]$$

$$n_B = n_A^0 \cdot \alpha_1 + n_B^0 \cdot (1-\alpha_2) \quad [4]$$

Regardless of the model used to describe the inter-conversion, the resulting equations must obey one of the most fundamental laws of nature—conservation of the amount:

$$n_A + n_B = n_A^0 + n_B^0 \quad [5]$$

However, the conservation of the amount seems to be often neglected in isotope dilution equations. Qvarnström and Frech, for example, attain the following expressions for the $Hg(II)/CH_3Hg^+$ system [Qvarnström 2002]:

$$n_{Hg(II)}^0 = n_{Hg(II)} - n_{MeHg+} \cdot b_2 \quad [6]$$

$$n_{MeHg+}^0 = n_{MeHg+} - n_{Hg(II)} \cdot b_1 \quad [7]$$

The above equations violate the amount balance of Hg(II) and $CH_3Hg^+$, i.e. does not lead to Eq. [5]. Only if $b_1 = b_2 = 0$ does the above equation fulfill the conservation of amount. Numerically these coefficients ($b_1$, $b_2$) are identical to the "degradation factors", $F_i$, of Rodríguez-González et al. [Rodríguez-González 2007; Rodríguez-González 2004]. For a two-component system consider the following amount balance equations:

$$n_A = n_A^0 \cdot (1-F_1) + n_B^0 \cdot F_2(1-F_1) \quad [8]$$

$$n_B = n_A^0 \cdot F_1(1-F_2) + n_B^0 \cdot (1-F_2) \quad [9]$$

Violation of amount balance in this system is also evident as the sum of these two equations does not lead to Eq. [5]. Due to error cancellation, the values for the initial amount of analytes ($n^0$) are unbiased even though the underlying amount balance models are incorrect in most of these cases. Violation of amount balance leads to incorrect estimates of the amount of analytes present in solution at the time of analysis ($n_{A,B}$). An in silico experiment that illustrates this corollary is shown in Table 1.

TABLE 1

Amount of Hg(II) and $CH_3Hg^+$ from a sample initially containing 1.0 mol of each compound*

| Isotope dilution model | Conversion coefficients | Equations | n[Hg(II)] | n[$CH_3$Hg] |
|---|---|---|---|---|
| Hintelmann et al. | $b_{1,2} = 0.500, 0.667$ | [6], [7] | 2.50 mol | 2.25 mol |
| Rodríguez-González et al. | $F_{1,2} = 0.500, 0.667$ | [8], [9] | 0.83 mol | 0.50 mol |
| Kingston et al. | $\alpha_{1,2} = 0.250, 0.500$ | [3], [4] | 1.25 mol | 0.75 mol |
| Meija et al. | $\alpha_{1,2} = 0.250, 0.500$ | [3], [4] | 1.25 mol | 0.75 mol |

*Consider 1.0 mol of $^{201}Hg(II)$ that is mixed with 1.0 mol of $CH_3{}^{198}Hg^+$. Then, 50% of Hg(II) is transformed into $CH_3Hg^+$ resulting in 0.5 mol $^{201}Hg(II)$, 0.5 mol $CH_3{}^{201}Hg^+$ and 1.0 mol $CH_3{}^{198}Hg^+$. Then, 50% of the $CH_3Hg^+$ is converted into Hg(II) yielding to the following: 0.50 mol $CH_3{}^{198}Hg^+$, 0.25 mol $CH_3{}^{201}Hg^+$, 0.50 mol $^{198}Hg(II)$ and 0.75 mol $^{201}Hg(II)$. Amount of Hg(II) and $CH_3{}^{198}Hg^+$ at this point is 1.25 mol and 0.75 mol respectively. Using these "observed" isotope patterns of Hg(II) and $CH_3Hg^+$, any of the four existing isotope dilution models can now be used to calculate the inter-conversion coefficients and the amount of these compounds after inter-conversion (as per Eqs. [3], [4] or [6], [7] or [8], [9]).

As a result of amount imbalance (Eqs. [8], [9]) the coefficients $F_i$ and $\alpha_i$ are different (see Table 1). Analytical relationship between these is as follows:

$$F_1 = \frac{\alpha_1}{1-\alpha_2} \text{ and } F_2 = \frac{\alpha_2}{1-\alpha_1} \quad [10]$$

From here the numerical discrepancy between $F_1$ and $\alpha_1$ or $F_2$ and $\alpha_2$, as recently noted by Rodríguez-González et al. [Rodríguez-González 2007] (and later dismissed [Point 2008]), is evident. When all $\alpha_i$ are large, the numerical difference between both notations becomes obvious [Meija 2006a]. Conceptually, the coefficients $\alpha_1$ and $\alpha_2$ consistently describe the final state of inter-converting species whereas the coefficients of Hintelmann et al. and Rodríguez-González et al. link the degradation non-corrected (i.e. wrong) amount of species to the correct ones. Clearly, the latter coefficients have no meaning apart from the role as numerical correction factors.

While the above caveats do not diminish the capability of multiple spiking isotope dilution methods to infer about the species inter-conversion, it clearly shows that fundamental definitions and notation is urgently needed.

One Isotope Pattern, Several Explanations

Central to the isotope dilution paradigms is the idea that each measured isotope pattern determines a unique set of analyte concentrations [Meija 2008a]. While it is true, the same cannot be said about the analyte inter-conversion coefficients. Consider the inter-converting system of species A and B with their initial amounts of 5 mol and 1 mol respectively. Isotope patterns of these species are $\chi_{A,0} = (1.000, 0.000)$ and $\chi_{B,0} = (0.000, 1.000)$. These two compounds were mixed together and, after certain inter-conversion process, the isotope patterns of both of these compounds was $\chi_A = (0.882, 0.118)$ and $\chi_B = (0.714, 0.286)$.

Inter-conversion reactions can occur via different routes. For example, the reactions A→B and B→A can occur sequentially or simultaneously. In the case of Hg(II) and $CH_3Hg^+$, methylation of Hg(II) can occur prior to demethylation or vice versa. Both of these reactions can also occur simultaneously. All three scenarios, if applied to the observed isotope patterns, lead to drastically different explanations of the inter-conversion process. The above system, for example, can be explained with the gamut of values for the fraction of B that has converted into A and vice versa depending on the nature of the inter-conversion (FIG. 1). It is clear that the answer to the question what is the fraction of compound A that converts into B can be obtained only if the mechanism of the inter-conversion is known. This, however, is often not the case for systems where double-spiking isotope dilution is currently used in practice.

Extent of Conversion, ξ

The central aim of quantifying the inter-conversion of species is the measurement of the total amount of a compound that has converted into another species. This relates to the formal IUPAC definition of the extent of conversion (or reaction), ξ, as the number of chemical transformations divided by the Avogadro constant [IUPAC Compendium; Laidler 1996]. This is essentially the amount of chemical transformations. If a single forward reaction $\nu_1 Hg(II) \rightarrow \nu_2 MeHg^+$ occurs in a closed system and has known time-independent stoichiometry, the extent of conversion at any given time (t) is defined by the following particular expression:

$$\xi_{Hg\to MeHg} = \frac{n_{Hg\to MeHg}}{\nu_1} = \frac{n^0_{Hg(II)} - n^t_{Hg(II)}}{\nu_1} \quad [11]$$

Extent of conversion quantifies the amount of Hg(II) methylated to $CH_3Hg^+$ and, by definition, depends on the mechanism of the inter-conversion. Rather overlooked is the interpretation of the extent of reaction for reversible reactions since Eq. [11] no longer applies. For reversible process, such as $Hg(II) \leftrightarrows CH_3Hg^+$, the total amount of Hg(II) that has been methylated to $CH_3Hg^+$, i.e. ξ of the forward reaction, is also a function of the forward and backward rate constants $k_1$ and $k_2$:

$$\xi_{\rightarrow} = n_{Hg\to MeHg} = \int_t k_1 n_{Hg(II)}(t)\,dt \quad [12]$$

$$\xi_{\leftarrow} = n_{MeHg\to Hg} = \int_t k_2 n_{MeHg}(t)\,dt$$

Integrating these expressions leads to the following:

$$\xi_{\rightarrow} = n_{Hg\to MeHg} = \frac{k_1}{k_1+k_2}\left[n^0_{Hg(II)}(1+k_2t) + n^0_{MeHg}k_2t - n_{Hg(II)}(t)\right] \quad [13]$$

$$\xi_{\leftarrow} = n_{MeHg\to Hg} = \frac{k_2}{k_1+k_2}\left[n^0_{MeHg}(1+k_1t) + n^0_{Hg(II)}k_1t - n_{MeHg}(t)\right]$$

We also introduce the relative extent of conversion, $\xi_{r,A\to B}$, as the amount of A that converts into B during the course of reaction relative to the initial amount of A:

$$\xi_{r,A\to B} = \frac{\xi_{A\to B}}{n^0_A} \quad [14]$$

The concept of reaction extent is a ramification of chemical kinetics and is usually not used in practice of analytical chemistry in simultaneous inter-conversion processes. Rather, the mere difference between the initial and measured amounts (at time t) is commonly used as a substitute for the total amount of A that has converted into B. As an example, the fate of methylmercury in biota is often elucidated from inter-conversion coefficients (Hintelmann [1997; Hintelmann 1995] presumed to represent the total amount of Hg(II) methylated and $CH_3Hg^+$ demethylated, i.e. extent of (de)methylation. It is important to dissociate the extent of conversion with any of the inter-conversion factors stemming from the isotope dilution results. Traditionally the extent of conversion has been associated with the numerical values of the correction factors [Rodriguex-Gonzalez 2007]. While the definition of the extent of conversion can be realized in practice, the underlying mechanism of the inter-conversion must be specified. In certain cases it is possible to deduce an educated guess regarding this. For example, Cr(VI) is stable in alkaline medium and yeast digestion at 95° C. for the analysis of Cr(III) and Cr(VI) suggests that the oxidation of Cr(III), if any, will occur before the reduction of Cr(VI) once the digests are neutralized. In other cases, such as $CH_3Hg^+/Hg(II)$, the inter-conversion mechanisms are more complex and currently not well understood.

Degree of Conversion, α

Degree of conversion is often used to describe bi-directional processes such as ionization of electrolytes or dissociation of acids. In accord with the existing chemical nomenclature, degree of conversion of compound A ($\alpha_{A,B}$) is the amount fraction of A present in its converted form B [IUPAC Compendium]. In $Hg(II) \leftrightarrows CH_3Hg^+$ system, for example, degree of methylation is the amount of Hg(II) present as $CH_3Hg^+$ divided to the initial amount of Hg(II).

Notation of Species Inter-Conversion

In isotope dilution, the inter-conversion of analytes can be modeled via two conceptually different approaches: using macroscopic and microscopic degrees of reactions (thermodynamic approach) and rate constants (kinetic approach) [Boyd 1977]. In the thermodynamic approach the amount balance of the involved compounds is established by comparing the isotope patterns of the involved species before and after the potential inter-conversion using degree of reaction (conversion). The kinetic approach, however, describes the analyte formation and loss using explicit assumptions as to how the inter-conversion occurs in time, i.e. simultaneously or sequentially, involving first or other order kinetics. Both of these approaches exist in the literature. Within these approaches, the analyte inter-conversion is described using "amount fraction of species that converts into another species" [Rahman 2004] and "amount fraction of species that [has] converted into another species" [Rodríguez-González 2004; Rodríguez-González 2005a; Rodríguez-González 2007].

Phenomenological (Macroscopic) Notation

The thermodynamic approach to species inter-conversion describes the inter-conversion using phenomenological degree of conversion. In a two-component system we denote these coefficients as $\alpha_1$ and $\alpha_2$. For example, $\alpha_1=0.20$ means that 20% from the initial amount of compound A exists as B at the time of analysis given that the system (A, B) is closed. This, however, does not necessarily mean that 20% of compound A has converted into B. Hence the distinction between the degree of conversion (fraction of species that exists in the form of another species) and relative extent of conversion (fraction of species that has converted into another species). The amount balance of substances A and B before and after their inter-conversion can be written using degree of conversion, as in Eqs. [3] and [4], where $\alpha_1$ and $\alpha_2$ merely account for the difference between the initial and final amount of both species. As such, the phenomenological degrees of reaction can be obtained for every system, regardless the mechanism of the inter-conversion. Isotope dilution models developed by Kingston et al. [Kingston 1998] follow this notation and so does the matrix approach of Meija et al. [Meija 2006a]. We note that the traditional interpretation of $\alpha_1$ and $\alpha_2$ as "the fraction of Cr(III) that converts to Cr(VI) and vice versa" [Rahman 2004] or "the percentage of Cr(III) oxidized to Cr(VI) and vice versa" [USEPA 1998; USEPA 2007] is false. It must be replaced with "the fraction of the initial amount of Cr(III) that is Cr(VI) at the time of analysis and vice versa" [Jereb 2003]. It is important to stress that the phenomenological degrees of conversion will sustain their meaning only when the system of inter-converting species is known to be closed. However, amount balance experiments in this area are performed seldom.

Microscopic Notation

Microscopic approach to amount balance proceeds by knowing/assuming the mechanism of the inter-conversion. There are various ways two compounds may convert into each other as shown in FIG. 2. Consider the system where reactions A→B and B→A occur at different time periods (in that order) as in Scheme 2.3 of FIG. 2. Using the microscopic degree of reactions ($\alpha_{m1}$, $\alpha_{m2}$), the amount balance of the involved species before ($n^0$) and after ($n^1$) the first reaction step for this system can be written as follows:

$$n_A^1 = n_A^0\cdot(1-\alpha_{m1}) \quad [15]$$

$$n_B^1 = n_B^0 + n_A^0\cdot\alpha_{m1} \quad [16]$$

After the second reaction step, however, the amount of A and B are as follows:

$$n_A \equiv n_A^1 + n_B^1\cdot\alpha_{m2} = n_A^0\cdot(1-\alpha_{m1}\alpha_{m2}-\alpha_{m1}) + n_B^0\cdot\alpha_{m2} \quad [17]$$

$$n_B \equiv n_B^1\cdot(1-\alpha_{m2}) = n_A^0\cdot\alpha_{m2}(1-\alpha_{m1}) + n_B^0\cdot(1-\alpha_{m2}) \quad [18]$$

In other words, the microscopic degrees of reaction are the answer to a hypothetical question "how much of both species have converted into one another at each step of the conversion process". The relationship between the phenomenological (thermodynamic) and microscopic (kinetic) degrees of reaction depends on the conversion mechanism and for the above example system (Scheme 2.3 of FIG. 2) it is the following:

$$\alpha_{m1} = \frac{\alpha_1}{1-\alpha_2} \text{ and } \alpha_{m2} = \alpha_2 \quad [19]$$

One of the main pitfalls of the microscopic notation is the implicit idea that the species inter-conversion can be described using the constant degrees of reaction whereas the degree of reaction is not a constant over the course of any chemical reaction, regardless of their kinetic order (see Eq. [22] for example). Thus, in the context of amount balance equations in isotope dilution, it is only meaningful to use the phenomenological and not microscopic degree of reaction as species inter-conversion constants in Eqs. [1]-[2].

Kinetic Notation

Consider two analytes that can simultaneously inter-convert into each other according to first-order reactions A⇆B with rate constants $k_{A\to B}$ and $k_{B\to A}$. We denote these as $k_{A,B}$ and $k_{B,A}$. For such system, changes in the amount of these compounds can be established by the use of two coupled ordinary differential equations in accord to the law of 'active masses':

$$\begin{cases} \frac{dn_A}{dt} = -k_{A,B}n_A(t) + k_{B,A}n_B(t) \\ \frac{dn_B}{dt} = +k_{A,B}n_A(t) - k_{B,A}n_B(t) \end{cases} \quad [20]$$

This system can be solved using the eigenvalue/eigenvector method [Blanchard 2006]. At time t we observe the following amount of A and B:

$$\begin{cases} n_A = \frac{k_{B,A}+k_{A,B}e^{-k_\Sigma\cdot t}}{k_\Sigma}n_A^0 + \frac{k_{B,A}-k_{B,A}e^{-k_\Sigma\cdot t}}{k_\Sigma}n_B^0 \\ n_B = \frac{k_{A,B}-k_{A,B}e^{-k_\Sigma\cdot t}}{k_\Sigma}n_A^0 + \frac{k_{A,B}+k_{B,A}e^{-k_\Sigma\cdot t}}{k_\Sigma}n_B^0 \end{cases} \quad [21]$$

where $k\Sigma = k_{A,B}+k_{B,A}$. The (simplified) reversible reaction model has been applied before to obtain the rate constants of Hg(II) methylation and $CH_3Hg^+$ demethylation reactions [Rodriguez Martin-Doimeadios 2004]. Comparison of the obtained expression with Eqs. [3]-[4] leads to the following relationship between the phenomenological degrees of conversion and the rate constants for the simultaneous process:

$$\alpha_{A,B} = \frac{k_{A,B}}{k_\Sigma}(1-e^{-k_\Sigma\cdot t}) \text{ and } \alpha_{B,A} = \frac{k_{B,A}}{k_\Sigma}(1-e^{-k_\Sigma\cdot t}) \quad [22]$$

Values of $\alpha_1$ and $\alpha_2$ can be obtained experimentally from the phenomenological isotope dilution models, hence, the rate constants can be calculated from thereof:

$$k_{A,B}\cdot t = \frac{-\alpha_{A,B}}{\alpha_{A,B}+\alpha_{B,A}}\ln(1-\alpha_{A,B}-\alpha_{B,A}) \quad [23]$$

$$k_{B,A}\cdot t = \frac{-\alpha_{B,A}}{\alpha_{A,B}+\alpha_{B,A}}\ln(1-\alpha_{A,B}-\alpha_{B,A}) \quad [24]$$

If $\alpha_{A,B}+\alpha_{B,A} \ll 1$, $k_{A,B}\cdot t \approx \alpha_{A,B}$ and $k_{B,A}\cdot t \approx \alpha_{B,A}$ since $\ln x \approx (x-1)$ when $x \approx 1$. Solving the integral for the relative extent of conversion (noting that the constant of integration is not zero) leads to expressions that can be expressed using degrees of the individual conversions and the initial amount of both substances:

$$\xi_{r,A\to B} = \frac{\alpha_1\alpha_2}{(\alpha_1+\alpha_2)^2}\left[(\alpha_1+\alpha_2)\left(\frac{\alpha_1}{\alpha_2}-\frac{n_B^0}{n_A^0}\right)-\left(\frac{n_B^0}{n_A^0}+1\right)\ln(1-\alpha_1-\alpha_2)\right] \quad [25]$$

$$\xi_{r,B\to A} = \frac{\alpha_1\alpha_2}{(\alpha_1+\alpha_2)^2}\left[(\alpha_1+\alpha_2)\left(\frac{\alpha_2}{\alpha_1}-\frac{n_A^0}{n_B^0}\right)-\left(\frac{n_A^0}{n_B^0}+1\right)\ln(1-\alpha_1-\alpha_2)\right] \quad [26]$$

When $\alpha_1+\alpha_2 \ll 1$, relative extent of conversion is approximately equal to the degree of conversion, i.e. $\xi_{r,A\to B} \approx \alpha_1$ and $\xi_{r,B\to A} \approx \alpha_2$.

Numerical Example

The extent of conversion, i.e. the amount of compound that has been transformed into another, can be obtained by multiplying relative extent of conversion with the initial amount of the analyte. Consider an in silico experiment where 5 mol of $^{201}$Hg(II) and 0.01 mol of $CH_3{}^{198}Hg^+$ are added to a mercury-free solution of organic matter. After 7 hours of simultaneous first-order reactions, Hg(II)⇆$CH_3Hg^+$, the isotope patterns ($x_{198}$, $x_{201}$) of) both compounds was measured to be $x_{Hg}$=(0.00101, 0.99899) and $x_{MeHg}$=(0.16564, 0.83436). Results calculated from these observations are summarized in Table 2.

In this example, degree of $CH_3Hg^+$ demethylation is 50% whereas the relative amount of $CH_3Hg^+$ demethylated ($\xi_{r,\leftarrow}$) is by far larger, i.e. 150%. Hence, the amount of $CH_3Hg^+$ demethylated is underestimated by a factor of three. Further-more, the ratio of the methylation/demethylation extent, $\xi_{\rightarrow}/\xi_{\leftarrow}$=2.35, is significantly different from the conventional methylation-to-demethylation ratio M/D=10.0 [Hintelmann 1997; Qvarnström 2002; Monperrus 2007], which is equal to $(b_{1n1*})/(b_{2n2*})$ or $(F_{1n1*})/(F_{2n2*})$.

TABLE 2

Quantitation of $Hg(II)/CH_3Hg^+$ inter-conversion*

| Quantity | Value | Equation |
|---|---|---|
| Degree of methylation and demethylation** | $\alpha_1 = 0.005019$<br>$\alpha_2 = 0.5019$ | [3]-[4] |
| Amount of Hg(II) and $CH_3Hg^+$ after 7 h | n(Hg) = 4.9799 mol<br>$n(CH_3Hg^+) = 0.0301$ mol | [3]-[4] |
| Methylation and demethylation rate constants | $k_1 = 0.0010\ h^{-1}$<br>$K_2 = 0.1000\ h^{-1}$ | [23]-[24] |
| Relative extent of methylation and demethylation | $\xi_{r,\rightarrow} = 0.00698$<br>$\xi_{r,\leftarrow} = 1.485$ | [25]-[26] |
| Extent of methylation and demethylation | $\xi_{\rightarrow} = 0.0349$ mol<br>$\xi_{\leftarrow} = 0.0148$ mol | [14] |

*$Hg(II)/CH_3Hg^+$ inter-conversion has been modeled in silico by solving Eq. [21] with rate constants $k_1 = 0.0010\ h^{-1}$ and $k_2 = 0.1000\ h^{-1}$. Amounts of both analytes and the rate constants roughly mimic the conditions of typical estuarine waters.
**Obtained using the double spiking isotope dilution calculations [Meija 2006a].

While isotope dilution has been successfully used to estimate amount of species corrected for the analyte degradation and formation during the analysis, prior art underlying mathematical models have not been scrutinized. As a result, proper interpretation and clear definitions of the inter-conversion coefficients has been overlooked despite the recent widespread use of these coefficients in analytical method development. We recommend the use of the species inter-conversion coefficients consistent with the current IUPAC guidelines as summarized in Table 3, which will be used throughout the present specification. Surprisingly, the same applies to the amount of analyte at the time of analysis. The consequence of the above exposition is that the extent of the species inter-conversion can only be quantified when its mechanism is known. Parallels of this truism are found in quantitative analysis—it is only possible to quantify a compound whose identity is known, i.e. "quantification of an unknown compound" is an absurd (albeit often used) phrase [Meija 2008a].

TABLE 3

Quantities to describe chemical transformations

| Name | Symbol | Definition | SI unit |
|---|---|---|---|
| Extent of reaction[1, 2] | $\xi_{A\rightarrow B}$ | Number of chemical transformation $\nu_1 A \rightarrow \nu_2 B$ divided by the Avogadro constant | mol |
| Relative extent of reaction | $\xi_{r, A\rightarrow B}$ | Extent of reaction $\nu_1 A \rightarrow \nu_2 B$ divided by the initial amount of A | 1 |
| Degree of reaction[3, 4] | $\alpha_{A\rightarrow B}$ | Amount fraction of A present in its converted form B | 1 |
| Correction factor[5] | F | Numerical factor by which the uncorrected result of a measurement is multiplied to compensate for systematic error | 1 |

[1]Equation $\xi_A = (n_A - n_{Ao})/\nu_A$ applies only to a single reaction, $\nu_A A \rightarrow \nu_B B$, occurring in a closed system. Here $n_{Ao}$ is the initial amount of the entity A, $n_A$ is its amount at time t, and $\nu_A$ is the stoichiometric number for that entity in the reaction equation as written [IUPAC Compendium].
[2]Extent of reaction is often confused with the degree of reaction.
[3]Most common interpretations of this variable are degree of dissociation, ionization and polymerization.
[4]When the term "reaction" covers multitude of chemical reactions, α represents phenomenological (macroscopic) degree of reaction. To distinguish between the microscopic and macroscopic degrees of reaction, subscript "m" can be added to denote the former.
[5]Uncorrected result refers to the result that is obtained using isotope dilution equations that ignore any analyte formation. Systematic error here refers only to the error introduced by neglecting the analyte formation [International Organization for Standardization 1993].

Uncertainties

Inter-conversion of analytes is inevitably accompanied with the loss of information) that can be extracted from the isotope patterns. Therefore, any corrections for analyte inter-conversion are performed at the expense of the precision of the obtained amount of the inter-converting analytes. Consequently, there is a natural, predictable limit to the applicability of multiple-spiking isotope dilution methods.

As the importance of analyte inter-conversions was established and multiple spiking isotope dilution was employed to correct for the inter-conversion [Point 2007; Monperrus 2008; Kingston 1998] little attention has been devoted regarding the fundamental limitations and consequences of such corrections. For example, how does the inter-conversion affect the uncertainty of the analytical results and what role does the amount ratio of the inter-converting species play? While intuitively it has been known that inter-conversion degrades the precision of the amount estimates [USEPA 1998] mathematical analysis of this phenomenon is clearly lacking [Monperrus 2008], given the fact that the fundamental aspects of multiple-spiking isotope dilution are not well understood in the first place as discussed above.

There remains a need in the art for a method multiple spiking isotope dilution analysis for mass spectrometry that provides precise and simultaneous characterization of substances in a sample, and particularly a method in which uncertainties in the characterization can be accurately estimated.

SUMMARY OF THE INVENTION

A comprehensive approach for interpretation of the multiple spiking isotope dilution results is described herein. It has now been found that a method of multiple spiking isotope dilution analysis for mass spectrometry is possible using an approach that permits precise and simultaneous characterization of m substances from a sample even if species inter-conversion (degradation and formation) has occurred prior to separation. Advantageously, initial and final amounts of involved analytes, conversion extent, conversion degree and rate constants from the results of a single quantitation experiment may be obtained with the present method. The present method facilitates the use of isotope tracers to infer not only the degradation-corrected amount of substances but also the reaction rate constants and extent or degree of inter-conversion reactions.

In a particularly advantageous embodiment, uncertainty in the characterization of the substances may be estimated more accurately by also estimating increase in the uncertainty due to inter-conversion of the analytes.

Thus, there is provided a method of multiple spiking isotope dilution mass spectrometry comprising: obtaining a mass spectrum of a chemical system having two or more inter-converting analytes of interest, the chemical system having been spiked with known amounts of isotopes of the analytes; determining systematic instrument biases corrected values of a mass spectrometric parameter of the analytes from the mass spectrum of the spiked chemical system; determining pure component contribution coefficients for each analyte in the mass spectrum by mathematically deconvoluting the) corrected values of the mass spectrometric parameter using pure component mass spectra of the analytes; determining a property of one or more of the analytes in the chemical system from the pure component contribution coefficients determined for each analyte; and, estimating uncertainty in the property including estimating an increase in the uncertainty due to inter-conversion of the analytes.

There is further provided a method of multiple spiking isotope dilution mass spectrometry comprising: obtaining a mass spectrum of a chemical system having two or more inter-converting analytes of interest, the chemical system having been spiked with known amounts of isotopes of the analytes; determining systematic instrument biases corrected isotope ratios of the analytes from the mass spectrum of the spiked chemical system; and, determining pure component contribution coefficients for each analyte in the mass spectrum by mathematically deconvoluting the corrected isotope ratios using pure component mass spectra of the analytes. A property of one or more of the analytes in the chemical system may be determined from the pure component contribution coefficients determined for each analyte.

Deconvolution is preferably performed on a matrix expression relating the corrected values of the mass spectrometric parameter to a linear combination of the pure component mass spectra and the pure component contribution coefficients for each analyte. Mass spectrometric parameters may include, for example, one or more of mass spectrometric signal intensities, isotope abundances or isotope ratios. Preferably, the mass spectrometric parameter is isotope ratios. In a particularly preferred embodiment, the matrix expression relates isotope ratios (R) to pure component mass spectra (X) and D pure component contribution coefficients (A) using Eq. [28]:

$$\begin{pmatrix} R_{1,1} & \dots & R_{1,m} \\ R_{2,1} & \dots & R_{2,m} \\ \dots & \dots & \dots \\ R_{p,1} & \dots & R_{p,m} \end{pmatrix} = \begin{pmatrix} x^*_{1,l} & \dots & x^*_{1,m} & x^{nat}_{1,m+1} & \dots & x^{nat}_{1,m+q} \\ x^*_{2,l} & \dots & x^*_{2,m} & x^{nat}_{2,m+1} & \dots & x^{nat}_{2,m+q} \\ \dots & \dots & \dots & \dots & \dots & \dots \\ x^*_{p,l} & \dots & x^*_{p,m} & x^{nat}_{p,m+1} & \dots & x^{nat}_{p,m+q} \end{pmatrix} \cdot \begin{pmatrix} a_{1,1} & \dots & a_{1,m} \\ a_{2,1} & \dots & a_{2,m} \\ \dots & \dots & \dots \\ a_{m+q,1} & \dots & a_{m+q,m} \end{pmatrix} \quad [28]$$

Deconvolution is preferably performed by matrix inversion (when the matrix is a square matrix) or least squares methods.

A property of one or more of the analytes in the chemical system may be determined from the pure component contribution coefficients determined for each analyte. The property may include, for example, amount (n) of an analyte (initial and/or final amount), degree of conversion ($\alpha$) for an analyte, rate constant (k) for conversion of an analyte to another analyte, extent of conversion ($\xi$) for an analyte, or any combination thereof.

Estimating an increase in the uncertainty of a property preferably comprises estimating an increase in the uncertainty of the amount of analyte. The increase in uncertainty of the amount of analyte due to inter-conversion of analytes may be estimated from initial amount ratios of the inter-converting analytes and degree of analyte formation and degradation. Preferably, such an increase in uncertainty is determined by:

$$f_{\leftrightarrows}(M_k) \approx 1 + \sum_{i \neq k}^{m} F_{i\to k} \frac{n_{M_i}}{n_{M_k}} \delta_{i\to k} \quad [61]$$

wherein $f_{\leftrightarrows}$ is increase in uncertainty of amount of analyte $M_k$ due to inter-conversion of species $M_1$-$M_m$, $n_{Mi}$ is initial amount of analyte $M_i$, $n_{Mk}$ is initial amount of analyte $M_k$, $F_{i\to k}$ is inter-conversion amount correction factor for inter-conversion of $M_i$ to $M_k$, and $\delta_{i\to k}$ is:

$$\delta_{i\to k} = \frac{1}{2} e^{F_{i\to k} F_{k\to i}} \left(2 + \frac{1}{2 - F_{i\to k} - F_{k\to i}}\right) \quad [62]$$

wherein $F_{i\to k}$ is inter-conversion amount correction factor for interconversion of $M_i$ to $M_k$ and $F_{k\to i}$ is inter-conversion amount correction factor for interconversion of $M_k$ to $M_i$.

Systematic instrument biases may include, for example, mass-bias, uneven signal suppression, detector dead-time, and any combination thereof.

The method may be embodied as computer code for execution on a computer and stored on any suitable computer-readable medium, for example, a hard drive, a memory stick, a CD, a DVD or a floppy diskette. The computer code may be installed as software on any suitable computer and execution of the computer readable code may be performed by any suitable computer, for example stand-alone personal computers, servers, etc. The computer code may be installed as software on computers associated with mass spectrometers, either alone or as part of a software package for the operation of mass spectrometers and/or analysis of mass spectrometric data.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 3 depicts the principle of multiple spiking isotope dilution for inter-converting substances;

FIG. 4 is a flowchart of a multiple spiking isotope dilution data analysis from elemental or deconvoluted pseudo-elemental mass spectra of inter-converting substances in accordance with a method of the present invention;

DESCRIPTION OF PREFERRED EMBODIMENTS

Example 1

Figure 1:
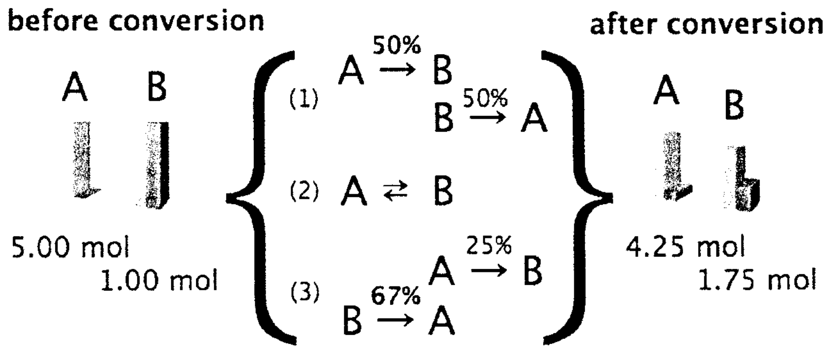
FIG. 1 is a scheme showing that, in prior art methods, given the amounts and isotope patterns of components A and B before and after their inter-conversion alone, no information can be drawn regarding their inter-conversion process.
Figure 2:
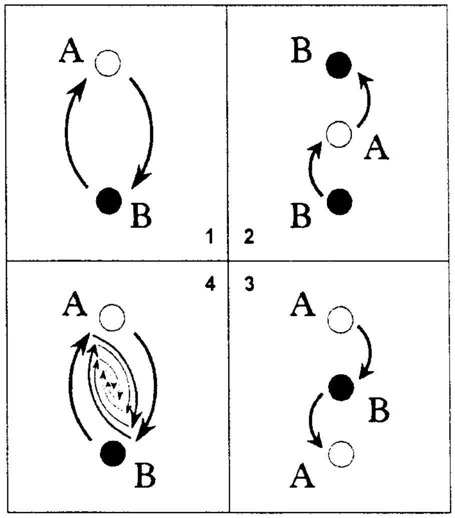
FIG. 2 is a scheme showing that inter-conversion of A and B can be a simultaneous (1) or sequential (2-4) process or any combination of these.

Characterization of Substances in a Multi-Component System

A comprehensive approach for isotope dilution analysis using partial or complete isotope patterns of analyte(s), enriched spike(s) and their mixture is described herein. As a basis to this approach, isotope dilution is mathematically treated as the superimposition of the natural isotope pattern of the analyte with the isotopically altered (enriched) isotope pattern as illustrated in FIG. 3 [Meija 2004; Meija 2006a].

For isotope dilution to provide estimates of both initial analyte concentrations and rate constants of the inter-conversion reactions occurring within a group of m compounds, the system should be closed and isotope patterns should be known for all analytes before spiking. Addition of the enriched spikes should be designed so that each compound is defined by at least one unique isotope pattern (in its natural or enriched form) and at least m+1 of these isotope patterns is different. To improve the precision of the isotope dilution results, it is advantageous to use enriched spikes with isotope patterns as different as possible from each other. One of the limitations of multiple spiking isotope dilution is usually the complexity of the chemical systems studied. Factors such as the presence of multiple reaction pools, open reaction systems, sampling or analysis constraints restrict the quality and accuracy of the information that can be accessed.

Currently, several isotope dilution approaches exist, most of them recent, to properly estimate the amount of substances n(0) and n(t), degree of reactions, and rate constants for two component systems using isotope dilution mass spectrometry. For three component systems, however, only proper estimates of n(0) are available [Rodríguez-González 2004], and not n(t) (see previous discussion infra), whereas a surprising advantage of the isotope pattern deconvolution approach described herein permits estimation of all parameters for arbitrary number of components from either the molecular or atomic mass spectra of the involved substances.

Isotope Pattern Deconvolution

Consider a system of m inter-converting analytes with β isotopes measured for each of these substances (p≥m+q), where q is the number of unique natural isotope patterns among the m substances (1≤q≤m). In routine elemental speciation analysis all analytes usually have indistinguishable isotope patterns (q=1). Such situations are encountered routinely in elemental speciation using low resolution (quadrupole, time-of-flight) inductively coupled plasma mass spectrometry (ICP-MS). Likewise, when high-precision mass spectrometers are employed, such as the multi-collector ICP-MS, natural fractionation of isotopes becomes evident and species of same element show different isotope patterns [Yang 2008]. Moreover, when reverse isotope dilution is performed, i.e. to estimate the concentration of the isotopically enriched substance using known amounts of natural isotopic composition standard, initial patterns of analytes are usually rather different owing to idiosyncratic isotopic enrichment procedures for each substance whereas the spikes, representing natural isotopic composition, might have identical isotope patterns.

All m compounds of interest are determined simultaneously using isotope dilution which comprises addition of the isotopically enriched internal standards (spikes) followed by chromatographic separation coupled to the mass spectrometer [Meija 2008a; Rodríguez-González 2005]. Let the known amounts of isotopically enriched analytes $M_1^* \ldots M_m^*$ added to the analyzed sample be $n(M_i^*)=n^*_{0,i}$. After isotopic equilibration the resulting isotopic patterns of all analytes is measured with mass spectrometry.

When elemental mass spectra are used, the observed spectra can be processed directly for isotope dilution equations, however, molecular mass spectra of the inter-converting analytes should be first deconvoluted into pseudo-elemental spectra (i.e., isotopomer composition) so that the isotopic signatures can be directly compared between the inter-converting substances. Several methods exist to extract isotope patterns of elements from the molecular ions, starting from the pioneering work of Biemann [Biemann 1962; Brauman 1966; Jennings 2005].

Once the elemental spectra of all m inter-converting species are obtained, the observed isotope patterns of all analytes (I) can be expressed as a linear combination of the pure component spectra (X) and the pure component amount in the resulting (observed) patterns (A), i.e. I=X·A [Meija 2004]. The same can be done with the observed isotope abundances or isotope ratios instead of intensities. Clearly, all of these quantities should be corrected for systematic instrument biases, such as mass-bias, uneven signal suppression or detector dead-time. The use of isotope ratios is preferred for several reasons. First, intensity data are too volatile and have to be normalized when D multiple replicates are performed. Second, isotope abundances of the observed substances represent only the relative proportions of the observed isotopes since rarely if ever are the entire isotope profiles monitored. Hence, "partial" isotope abundances can become misleading. Third, isotope ratios are by far the most common way of expressing measurement results in practice and are involved in all mass-bias correction heuristics. Consequently, we have expression R=X·A', or $$R_{i,k} = \sum_{j=1}^{m+q} a_{j,k} x_{i,j} \qquad [27]$$

where $R_{i,j}=I(^iM_j)/I(^{ref}M_j)$. In a matrix form it becomes more evident that coefficients $a_{j,k}$ are the link between the observed (convoluted) mass-bias corrected isotope ratios and pure component (deconvoluted) spectra:

$$\begin{pmatrix} R_{1,1} & \cdots & R_{1,m} \\ R_{2,1} & \cdots & R_{2,m} \\ \cdots & \cdots & \cdots \\ R_{p,1} & \cdots & R_{p,m} \end{pmatrix} = \begin{pmatrix} x^*_{1,1} & \cdots & x^*_{1,m} & x^{nat}_{1,m+1} & \cdots & x^{nat}_{1,m+q} \\ x^*_{2,1} & \cdots & x^*_{2,m} & x^{nat}_{2,m+1} & \cdots & x^{nat}_{2,m+q} \\ \cdots & \cdots & \cdots & \cdots & \cdots & \cdots \\ x^*_{p,1} & \cdots & x^*_{p,m} & x^{nat}_{p,m+1} & \cdots & x^{nat}_{p,m+q} \end{pmatrix} \cdot \begin{pmatrix} a_{1,1} & \cdots & a_{1,m} \\ a_{2,1} & \cdots & a_{2,m} \\ \cdots & \cdots & \cdots \\ a_{m+q,1} & \cdots & a_{m+q,m} \end{pmatrix} \qquad [28]$$

Here $R_{i,j}$ denotes the measured peak area ratios for $i^{th}$ isotope of compound $M_j$ ($^iM_j$) and $x_{i,j}$ are the isotopic abundances of all m pure spikes, $x^*_{i,j}=x(^iM_j^*)$, and natural isotopic abundances of all analytes, $x^{nat}_{i,m+q}$ ($1 \le q \le m$). It is important that isotopic abundances used in Eq. [28] are fractions of all the atoms of particular element, rather than normalized abundances of the measured isotopes only. Likewise, the abundances cannot be scaled to relative abundances, e.g. where maximum abundance is set to 100%. This also applies to deconvolution of molecular mass spectra into pseudo-elemental spectra.

To obtain the amount of m inter-converting substances, at least m+q isotopic abundances need to be measured for each compound. In the simplest case, when p=m+q, the contribution coefficient matrix A (or A') is determined via matrix inversion, $A'=X^{-1}R$. For p>m+q, on the other hand, this can be achieved by obtaining the least squares solution to Eq. [28] using the Moore-Penrose pseudoinverse, $A'=(X^TX)^{-1}X^TR$, among other methods [Lawson 1974]. Least squares solution can also be obtained using the LINEST( ) function in Microsoft Excel™. Note that the LINEST( ) function is equipped with built-in statistical features that can greatly simplify the uncertainty analysis of the obtained results or the internal mass-bias correction that operate by minimizing the squared sum of isotope pattern residuals [Rodríguez-Castrillón 2008]. Ultimately, the two unknown variables of interest are the amount of substances $M_1 \ldots M_m$ in the sample at the time of spiking, $n^0(M_i)=n_{0,i}$.

Amount of Substance

Realizing that the rows of the coefficient matrices A or A' are linearly dependent (representing the contribution of individual isotopic sources to the observed signal), the following identity can be established (j=1 . . . m):

$$\sum_{z=1}^{q} a_{m+z,j} = \sum_{i=1}^{m} a_{i,j}\frac{n_{0,i}}{n^*_{0,i}} \qquad [29]$$

From these m equations, the m unknowns ($n_{0,i}$) can be solved by combining Eqs. [28] and [29]. This leads to general equation for the amount of all analytes in the sample at the time of spiking (t=0):

$$n_{0,i} = n^*_{0,i}\frac{|A_i|}{|A_*|} \qquad [30]$$

Here $|A_*|$ is determinant of the m×m truncated coefficient matrix $A_*$ containing only the contributions from the enriched spikes, i.e. $a_{1,1}$ to $a_{m,m}$, whereas $|A_i|$ is determinant of the m×m matrix $A_*$ with coefficients from $M_i^*$ ($i^{th}$ row in A) replaced by coefficients from $M_i^{nat}$. This is the most general approach for simultaneous quantitation of m inter-converting) compounds with multiple spiking isotope dilution mass spectrometry and the above solution is also in stark contrast to the current practice of publishing virtually intractable isotope dilution equations for each particular system of inter-converting species. In case of two inter-converting substances, such as Cr(III)/Cr(VI), Eq. [30] reduces to the following [Meija 2006a] when m=2, q=1 and p=3:

$$n_{0,M_1} = n^*_{0,M_1}\frac{a_{2,2}a_{3,1} - a_{2,1}a_{3,2}}{a_{1,1}a_{2,2} - a_{1,2}a_{2,1}} \qquad [31]$$

$$n_{0,M_2} = n^*_{0,M_2}\frac{a_{1,1}a_{4,2} - a_{1,2}a_{4,1}}{a_{1,1}a_{2,2} - a_{1,2}a_{2,1}} \qquad [32]$$

If no inter-conversion occurs, compound $M_i$ is commonly quantitated by monitoring only two of its isotopes:

$$n_{0,i} = n^*_{0,i}\frac{a_{m+i,j}}{a_{i,i}} \qquad [33]$$

In such case the above expression can be reduced to the familiar isotope dilution equation:

$$n_{0,A} = n^*_{0,A}\frac{R_{A(obs)} - R_{A^*}}{R_A - R_{A(obs)}}\frac{\sum R_A}{\sum R_{A^*}} \qquad [34]$$

Likewise, if natural isotope pattern of substance $M_i$ is distinct from all others, Eq. [30] reduces to the following:

$$n_{0,i} = n^*_{0,i}\frac{a_{m+k,i}}{a_{i,i}} \qquad [35]$$

where the natural isotope pattern of $M_i$ is the column m+k of matrix X.

The above general solution for $n_i$, Eq. [30], can also be obtained in a slightly alternate way. Multiplying both sides of the Eq. [29] by $a_{i,i}^{-1} \cdot n^*_{0,i}$, we obtain $$\underbrace{\sum_{z=1}^{q}\frac{a_{m+z,i}}{a_{i,i}}n^*_{0,i}}_{I} = \sum_{j=1}^{m}\underbrace{\frac{a_{j,i}n^*_{0,i}}{a_{i,i}n^*_{0,j}}}_{II}n_{0,j} \qquad [36]$$

The first term of the above equation corresponds to the hypothetical degradation-uncorrected amount of substance, $n^\dagger$:

$$n_i^\dagger = n^*_{0,i}\sum_{z=1}^{q}\frac{a_{m+z,i}}{a_{i,i}} \qquad [37]$$

The second term in Eq. [36] can be viewed as a correction factor for the analyte amount due to degradation reaction $M_j \rightarrow M_i$, $F_{j\rightarrow i}=F_{j,i}$. Correction factors, F, are used rather frequently in the current literature [Point 2007; Monperrus 2008; Rodríguez-González 2004; Rodríguez-González 2005b; Rodríguez-González 2005c], however, it is important to realize that these are mere "correction" factors for the amount of substance and are not descriptors of the inter-conversion kinetics even though it is the latter interpretation that is commonly affixed to these factors. In this vein, Eq. [36] now can be written as $$n_i^\dagger = \sum_{j=1}^{m} F_{j,i}n_{0,j} \qquad [38]$$

where $F_{i,i}=1$ by definition. This can be further summarized in a matrix form as $n^\dagger = F^T \cdot n$. More specifically, $$\begin{pmatrix} n_1^\dagger \\ n_2^\dagger \\ \ldots \\ n_m^\dagger \end{pmatrix} = \begin{pmatrix} F_{1,1} & F_{2,1} & \ldots & F_{m,1} \\ F_{1,2} & F_{2,2} & \ldots & F_{m,2} \\ \ldots & \ldots & \ldots & \ldots \\ F_{1,m} & F_{2,m} & \ldots & F_{m,m} \end{pmatrix} \cdot \begin{pmatrix} n_{0,1} \\ n_{0,2} \\ \ldots \\ n_{0,m} \end{pmatrix} \qquad [39]$$

The vector of the corrected amount of substance $n=(F^{-1})^T n^\dagger$. Excel function LINEST( ) can also be used to solve for n. Note that $n^\dagger = n$ when F is the unity matrix. Such a case corresponds to the classical isotope dilution when no species inter-conversion occurs. Note that in the above equations $n_i$ refers to the amount of the natural analytes, not the total amount of the substances $M_i$ (natural and enriched spikes).

Degree of Conversion

Degree of conversion is an often-used quantity to describe the inter-conversion of analytes. In a closed system of m inter-converting compounds, degree of conversion $\alpha_{i,j}$ corresponds to the amount fraction of compound $M_i$ that is present in the form of $M_j$ after the inter-conversions. The relationship between degrees of conversion ($\alpha_{i\rightarrow j}=\alpha_{i,j}$) and the amount correction factors (F) has been established for two-component systems above and its generalization for m components is as follows:

$$F_{i,j} = \frac{\alpha_{i,j}}{1 - \sum_{z\neq j}^{m} \alpha_{j,z}} \quad [40]$$

This equation can be expressed and solved for $\alpha_{i,j}$ in a matrix form. For three-component system we obtain the following:

$$\begin{pmatrix} F_{1,2} \\ F_{1,3} \\ F_{2,1} \\ F_{2,3} \\ F_{3,1} \\ F_{3,2} \end{pmatrix} = \begin{pmatrix} 1 & 0 & F_{1,2} & F_{1,2} & 0 & 0 \\ 0 & 1 & 0 & 0 & F_{1,3} & F_{1,3} \\ F_{2,1} & F_{2,1} & 1 & 0 & 0 & 0 \\ 0 & 0 & 0 & 1 & F_{2,3} & F_{2,3} \\ F_{3,1} & F_{3,1} & 0 & 0 & 1 & 0 \\ 0 & 0 & F_{3,2} & F_{3,2} & 0 & 1 \end{pmatrix} \cdot \begin{pmatrix} \alpha_{1,2} \\ \alpha_{1,3} \\ \alpha_{2,1} \\ \alpha_{2,3} \\ \alpha_{3,1} \\ \alpha_{3,2} \end{pmatrix} \quad [41]$$

Alternatively, matrix determinants can be used to obtain degrees of reaction:

$$\alpha_{i\rightarrow j} = F_{i\rightarrow j}\frac{|F_j|}{|F|} \quad [42]$$

Here |F| is the determinant of the m×m correction coefficient matrix F (see Eq. [39]) and $|F_j|$ is the determinant of the F matrix with $j^{th}$ column replaced by ones. In the case of two inter-converting compounds, Eq. [42] reduces to the following:

$$\alpha_{1,2} = F_{1,2}\frac{\begin{vmatrix} 1 & 1 \\ F_{2,1} & 1 \end{vmatrix}}{\begin{vmatrix} 1 & F_{1,2} \\ F_{2,1} & 1 \end{vmatrix}} = F_{1,2}\frac{1 - F_{2,1}}{1 - F_{1,2}F_{2,1}} \quad [43]$$

The total amount of substance $M_i$ at the time of spiking is the sum of both $M_i$ and $M_i^*$, $n_i(0)=n_{0,i}+n^*_{0,i}$. Following the definition of the degree of conversion, the total amount of substance $M_i$ (both natural and enriched) at the time of analysis can be determined using the following equation:

$$n_i(t) = n_i(0)\cdot\sum_{j\neq i}^{m}(1-\alpha_{i,j}) + \sum_{j\neq i}^{m} n_j(0)\cdot\alpha_{j,i} \quad [44]$$

By comparing the mathematically deduced amounts with the actual (measured) final amounts, it is possible to evaluate whether or not the defined system is closed or detect the presence of other transformations or pools.

Although the correlation between the contribution coefficients $a_{i,j}$, amount of substances $n_i$, degree of reactions $\alpha_{i,j}$ and correction factors $F_{i,j}$ is irrelevant for practical purposes, it, nevertheless, exists. This is due to the fact that as regression parameters, the contribution coefficients $a_{i,j}$ are not independent variables. We note that the correlation between variables simply means that one is influenced by another, not determined.

Rate Constants

The use of isotopes to determine the rate constants of chemical reactions dates) back for over sixty years [Branson 1947; Cornfield 1960; Di 2000]. The particular solutions of the involved rate constants clearly depend on the complexity of the kinetic model yet the most universal approach to obtain the estimates of rate constants is via non-linear fitting of the experimental data to the kinetic model. It is possible to use a non-linear least squares minimization of the observed isotope patterns to obtain all rate constants. For faster convergence, $a_{i,j}/t$ can be used as the initial guess values for $k_{i\rightarrow j}$. The obtained rate constants will only be representative if the system is closed (no exchange of compounds with other systems), steady (fixed temperature, fixed volume) and if all compounds influencing the kinetics are taken into account, which is usually the case for in vitro studies. For the maximum possible network of m(m−1) first-order reactions between m compounds, the following differential kinetic equation can be written (i=1 . . . m):

$$\frac{dn_i}{dt} = -\sum_{j\neq i}^{m} k_{i\rightarrow j}n_i(t) + \sum_{j\neq i}^{m} k_{j\rightarrow i}n_j(t) \quad [45]$$

The above expression can be re-written for each isotope p:

$$\frac{dn_{p,i}}{dt} = -\sum_{j\neq i}^{m} k_{i\rightarrow j}n_{p,i}(t) + \sum_{j\neq i}^{m} k_{j\rightarrow i}n_{p,j}(t) \quad [46]$$

Clearly, for each chemical system under consideration the above kinetic equations have to be tailored with respect to proper kinetic order and other reactants in accord to the law of active masses. All m(m−1) rate constants $k_{i\rightarrow j}$ can be obtained using a non-linear iterative fitting of the above differential equation solutions to the observed isotope patterns of all compounds $M_i$ [Bijlsma 2000]. The above differential equations can be solved, for example, using the Euler's method:

$$n_{p,i}(t+\Delta t) = n_{p,i}(t) + \Delta t\cdot\frac{dn_{p,i}}{dt} \quad [47]$$

where derivative $dn_{p,i}/dt$ at the time t is the right side of the Eq. [46]. Starting from t=0 and the initial guess values for $k_{i\rightarrow j}$, Eq. [47] is solved for $n_{p,i}(t)$ until t reaches the time of analysis. Once all $n_{p,i}$ are calculated for the given set of $k_{i\rightarrow j}$ and time, the isotope patterns for each substance are compared with the experimental isotope patterns until a set of $k_{i\rightarrow j}$ is obtained that fits well the observed isotope patterns. In Microsoft Excel™ such iterative fitting can be performed using the SOLVER option.

Extent of Conversion

Extent of conversion (or reaction), ξ, is the number of chemical transformations divided by the Avogadro constant.

It is essentially the amount of chemical transformations and can be evaluated from its definition, applicable to reaction $\nu_i A_i \rightarrow \nu_j A_j$:

$$\xi_{i\rightarrow j}(t) = \frac{1}{\nu_i}\int_0^t k_{i\rightarrow j}\, n_i(t)^{\nu_i}\, dt \qquad [48]$$

Once all the rate constants are obtained and the initial amounts of all substances known, this integral can be evaluated similarly to the way rate constants are obtained.

Characterization of a System of Four Inter-Converting Compounds

Consider a closed system of four inter-converting compounds $A_1$, $A_2$, $A_3$ and $A_4$ with identical natural isotope patterns and their isotopically enriched analogues (five isotopes, p=5):

$$x(A_{1-4}) = \begin{pmatrix} \overset{nat}{0.129} \\ 0.478 \\ 0.110 \\ 0.132 \\ 0.054 \end{pmatrix},\; x(A_i^*) = \begin{pmatrix} \overset{i=1}{0.875} & \overset{2}{0.002} & \overset{3}{0.001} & \overset{4}{0.001} \\ 0.082 & 0.021 & 0.001 & 0.002 \\ 0.021 & 0.941 & 0.005 & 0.005 \\ 0.002 & 0.015 & 0.961 & 0.032 \\ 0.001 & 0.005 & 0.022 & 0.948 \end{pmatrix}$$

One gram of sample containing unknown amounts of these four compounds is spiked with known amounts (1.0 mol) of isotopically enriched isotopic spikes, each with distinct isotope pattern. After 3 h, traditional chemical analysis takes place involving extraction, derivatization and separation of all analytes. The following isotope ratios of all four compounds are obtained (with respect to the first isotope):

$$R(A_i) = \begin{pmatrix} \overset{i=1}{1.000} & \overset{2}{1.000} & \overset{3}{1.000} & \overset{4}{1.000} \\ 1.220 & 2.024 & 1.511 & 1.559 \\ 0.663 & 1.901 & 0.608 & 0.925 \\ 1.097 & 1.122 & 1.669 & 0.857 \\ 0.361 & 1.055 & 0.575 & 1.149 \end{pmatrix}$$

Isotope dilution calculations are now applied to obtain 1) amount of all analytes in the sample at the time of spiking and 2) details of the inter-conversion that took place during the analysis. The following amount of all analytes were obtained: $n(A_1)$=0.80 mol, $n(A_2)$=1.20 mol, $n(A_3)$=1.25 mol and $n(A_4)$=1.30 mol. The results for the inter-conversion descriptors are summarized in Table 4.

TABLE 4

Numerical results for the inter-converting four component system

| i→j | $F_{i\rightarrow j}$ | $\alpha_{i\rightarrow j}$ | $k_{i\rightarrow j}$, $h^{-1}$ | $\xi_{i\rightarrow j}$, mol |
|---|---|---|---|---|
| 1→2 | 0.353 | 0.160 | 0.040 | 0.225 |
| 2→1 | 0.509 | 0.156 | 0.150 | 0.994 |
| 1→3 | 0.533 | 0.156 | 0.175 | 0.985 |
| 3→1 | 1.012 | 0.309 | 0.410 | 2.005 |
| 1→4 | 0.667 | 0.378 | 0.620 | 1.801 |
| 4→1 | 0.283 | 0.086 | 0.000 | 0.000 |
| 2→3 | 0.206 | 0.060 | 0.000 | 0.000 |
| 3→2 | 0.364 | 0.165 | 0.110 | 0.538 |
| 2→4 | 0.584 | 0.331 | 0.190 | 1.259 |
| 4→2 | 0.564 | 0.255 | 0.180 | 1.531 |
| 3→4 | 0.411 | 0.233 | 0.010 | 0.049 |
| 4→3 | 0.309 | 0.091 | 0.075 | 0.638 |

Correction coefficients or degrees of conversion do not reflect the kinetics or even the 'nature' of the inter-conversion. The fact that $F_{i,j}$ or $\alpha_{i,j}$ is not zero does not warrant a conclusion that the particular reaction pathway does not occur. Only when $F_{i,j}$ or $\alpha_{i,j}$ is zero can we conclude that the pathway i→j does not occur. This point can further be illustrated with uni-directional tributyltin degradation model [Ruiz Encinar 2002]:

$$Bu_3Sn^+ \xrightarrow{k_{3\rightarrow 2}} Bu_2Sn^+ \xrightarrow{k_{2\rightarrow 1}} BuSn^+.$$

Relative extent of direct degradation of tributyltin into monobutyltin, $\xi_{r,3\rightarrow 1}$, for such a system can be obtained from the kinetic expressions of the above first-order consecutive reaction model. The following approximation holds true:

$$\xi_{r,3\rightarrow 1} \approx F_{3\rightarrow 1} - \frac{F_{3\rightarrow 2}F_{2\rightarrow 1}}{2} \qquad [49]$$

Hence, if no direct degradation of $Bu_3Sn^+$ to $BuSn^+$ occurs, i.e. $\xi_{r,3\rightarrow 1}=0$, the following non-zero value for degradation factor $F_{3\rightarrow 1}$ will be observed:

$$F_{3\rightarrow 1} \approx \frac{F_{3\rightarrow 2}F_{2\rightarrow 1}}{2} \qquad [50]$$

In accordance with this equation, slight rise in the value of $F_{3\rightarrow 1}$ (+0.007) has been observed experimentally when $F_{3\rightarrow 2}$ and $F_{2\rightarrow 1}$, increased to 0.043 and 0.343 accordingly [Rodríguez-González 2004], exactly as predicted by Eq. [50].

In short, the numerical values for the $F_{i,j}$ or $\alpha_{i,j}$ cannot be used, as it is done rather frequently, to infer about the extent of the particular reactions. The ratio $F_{3,4}/F_{4,3}$ or $\alpha_{3,4}/\alpha_{4,3}$ in Table 4, for example, misleads about the predominance of the 3→4 reaction over 4→3 whereas the extent of these two reactions clearly shows the opposite.

Uncertainties of all output variables, i.e. $n_0$, n(t), F, α, k and ξ, could be evaluated using a variety of methods. Monte-Carlo simulations may be used which, in essence, comprise the addition of random noise (e.g. 1%) to the measured isotope ratios of each compound. Alternatively uncertainties of the output variables could be evaluated using the Kragten method [Kragten 1994]. Here each input variable (measured isotope ratio) is perturbed with noise separately and the resulting changes in output variables are then summed in quadrature. Correlation between the isotope ratios cannot be dismissed [Meija 2008b]. For a more accurate estimate of uncertainties, the method disclosed herein below is preferred.

In summary, initial amount of the inter-converting analytes can be obtained by solving two matrix equations, i.e. Eq. [28] and Eq. [30] or Eq. [38], as illustrated in the flowchart depicted in FIG. 4. The larger the analyzed system (m), the more precise the measurements must be to deconvolute the observed data. Two component case can be applied to systems like Cr(III)/Cr(VI), $CH_3Hg^+$/Hg(II), Pb(II)/Pb(IV), $Br^-BrO_3^-$, Fe(II)/Fe(III), L/D-racemization or cis/trans-isomerization. Among the most common three component systems encountered in current analytical practice are $Ph_3Sn^+/Ph_2Sn^+/PhSn^+$, $Bu_3Sn^+/Bu_2Sn^+/BuSn^+$ and $Hg^0$/Hg(II)/$CH_3Hg^+$. Four component systems are encountered in analytical chemistry, for example, when two compounds can be distributed between two phases (solid/liquid). Such particular case is encountered in Cr(III)/Cr(VI) determination from solid matrices, arguably a key application in the industrial sector.

Currently data analysis remains a major obstacle for the facile development of ingenious multiple spiking isotope dilution methods capable of correcting for the formation and loss of the analyte during sample preparation or analysis. The formulation of data analysis outlined above solves this problem and offers an intuitive expansion for the future development of quantitation of labile analytes. To date, species-specific isotope dilution methods have been successfully used in accurate quantitation of Cr(VI) and methylmercury in various biological materials and recently species-specific isotope dilution analysis has been adopted as an official method in the United States, hence it may be used in monitoring or complying with the Resource Conservation and Recovery Act [*Federal Register* 2008].

Example 2

Estimating Uncertainties

Information Content

Unlike external calibration or standard addition that relies on the measured signal intensity comparison, the information about the amount of substance in isotope dilution is obtained by comparing the isotope patterns (e.g. isotope ratios) of the spike and the analyzed (spiked) mixture. Addition of too little spike results in isotopic pattern where the contribution of spike is negligible. Likewise, adding too much spike results in poor estimates of the contribution of the analyte. Since the concentration of the analyte is essentially the ratio of both contributions, naturally, a balance must be sought. However, it is not a trivial 1:1 amount ratio of the analyte and spike that guarantees the most precise estimates of the analyte concentration. Optimum analyte-to-spike ratio depends on the analyte and spike isotope pattern geometry [Riepe 1966; De Bièvre 1965], random error characteristics of the detector [Hoelzl 1998] and signal correlation [Meija 2007].

Consider analyte (A) and its enriched spike (A*). Isotope patterns of these compounds can be expressed as column vectors, $\vec{P}_A$ and $\vec{P}_{A^*}$. When known amount of the enriched spike, $n_{A^*}$, is added to the sample, the resulting isotope pattern of compound A, $\vec{P}_{A(mix)}$, is the amount-weighted combination of both isotope patterns $\vec{P}_A$ and $\vec{P}_{A^*}$:

$$\vec{P}_{A(mix)}=x_A\vec{P}_A+x_{A^*}\vec{P}_{A^*} \quad [51]$$

where $x_A=n_A/(n_A+n_{A^*})$ and $x_{A^*}=n_{A^*}/(n_A+n_A^*)$. The only unknown variable in this equation is the amount of analyte, $n_A$, which can be solved for using elementary algebra:

$$n_A(\vec{P}_{A(mix)}-\vec{P}_A)=n_{A^*}(\vec{P}_{A^*}-\vec{P}_{A(mix)}) \quad \text{Eq. [52]}$$

Eq. [52] is the most general expression for isotope dilution method and from here it is evident that the amount of analyte is deduced by quantifying the dissimilarity (difference) between the isotope patterns of spike, analyte and their mixture in the sample.

The above equation can be demonstrated in practice using the following exercise: 2.0 mol of 90% enriched $^{107}Ag$ is added to a Ag-containing sample, with $P_{Ag}=(0.50, 0.50)$, and the observed isotope pattern of silver was $P_{mix}=(0.70, 0.30)$. Eq. [52] for this analysis is as follows:

$$n_{Ag}\left(\begin{bmatrix}0.70\\0.30\end{bmatrix}-\begin{bmatrix}0.50\\0.50\end{bmatrix}\right)=n_{Ag^*}\left(\begin{bmatrix}0.90\\0.10\end{bmatrix}-\begin{bmatrix}0.70\\0.30\end{bmatrix}\right), \text{ or} \quad [53]$$

$$n_{Ag}\begin{bmatrix}+0.20\\-0.20\end{bmatrix}=2.0\cdot\begin{bmatrix}+0.20\\-0.20\end{bmatrix} \quad [54]$$

From here it is evident that $n_{Ag}=2.0$ mol. While the Eq. [52] serves to illustrate the role of isotope pattern differences in isotope dilution analysis, the most common form of isotope dilution equations are set using the ratios of isotope abundances.

Scrambling of Isotope Patterns

Generally, physical mixing of the analyte and spike leads to the resulting isotope pattern that is a simple amount-weighted average of both patterns (Eq. [51]). Such a scenario, however, describes physical mixing of substances and does not hold true in the presence of chemical reactions between them, such as isotopic exchange between the analyte and spike. For example, mixing equimolar amounts of $H_2O$ and $D_2O$ gives a mixture whose mass spectrum cannot be explained by a mere sum of the two component mass spectra due to the formation of HOD [Meija 2006b]. Similarly, if the $^{13}C$-enriched $CO_2$ and natural $CO_2$ do not have identical isotopic composition of oxygen, isotopic equilibration will occur upon mixing of these two substances much like it does with $OH_2$ and $OD_2$ [Gonfiantini 1997].

Figure 5:
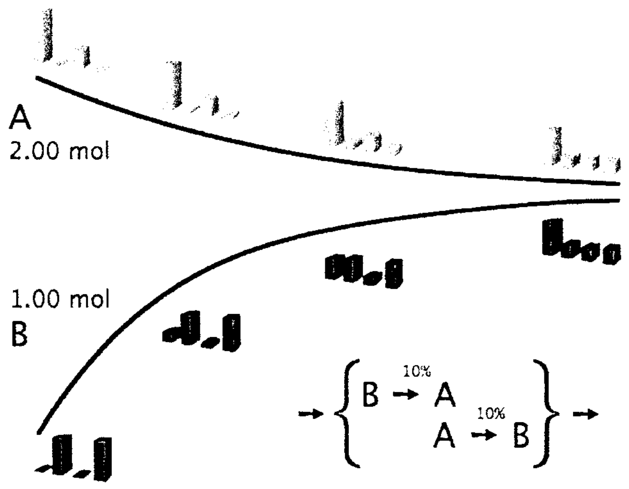
FIG. 5 depicts that inter-conversion of two compounds, A⇆B, simultaneously or sequentially, leads to the scrambling of isotope patterns, i.e. eventually the isotope patterns of both species become identical.

Perhaps a much lesser appreciated consequence of species inter-conversion is the inherent dissolution of the individual isotope patterns: every 'cycle' of analyte formation and degradation is accompanied with the decrease in dissimilarity of isotope patterns between the involved analytes. The isotope pattern dissimilarity eventually vanishes entirely upon the prolonged analyte inter-conversion. Such scrambling of the isotopic signatures is a general feature of analyte inter-conversion, regardless whether it occurs simultaneously or sequentially. FIG. 5 demonstrates this phenomenon in silico for the sequential inter-conversion of two substances with arbitrary isotope patterns.

Scrambling of isotopic patterns can be explained from the basic principles of chemical kinetics. Consider two simultaneous first-order reactions A⇆B with rate constants $k_1$ and $k_2$. For such a system, changes in the amount of these compounds are described by the use of coupled ordinary differential equations in accord to the law of 'active masses':

$$\begin{cases}\dfrac{dn_A}{dt}=-k_1n_A+k_2n_B\\[2mm]\dfrac{dn_B}{dt}=+k_1n_A-k_2n_B\end{cases} \quad [55]$$

Solving this system using the eigenvalue/eigenvector method [Blanchard 2006] leads to the following amount of substances A and B as a function of time:

$$\begin{cases}n_A=\dfrac{k_2+k_1e^{-k't}}{k'}n_A^0+\dfrac{k_2-k_2e^{-k't}}{k'}n_B^0\\[2mm]n_B=\dfrac{k_1-k_1e^{-k't}}{k'}n_A^0+\dfrac{k_1+k_2e^{-k't}}{k'}n_B^0\end{cases} \quad [56]$$

Here $k'=k_1+k_2$ and $n^0$ is the corresponding amount before inter-conversion. After sufficiently long time ($t=\infty$) the species inter-conversion can be considered complete and Eq. [56] reduces to the following:

$$\begin{cases} n_A = \frac{k_2}{k'}(n_A^0 + n_B^0) \\ n_B = \frac{k_1}{k'}(n_A^0 + n_B^0) \end{cases} \quad [57]$$

From these equations it becomes evident that the isotope amount ratios $n(^1A)/n(^2A)$ and $n(^1B)/n(^2B)$ will be identical at this point:

$$\frac{n(^1A)}{n(^2A)} = \frac{n(^1B)}{n(^2B)} \quad [58]$$

Figure 6:
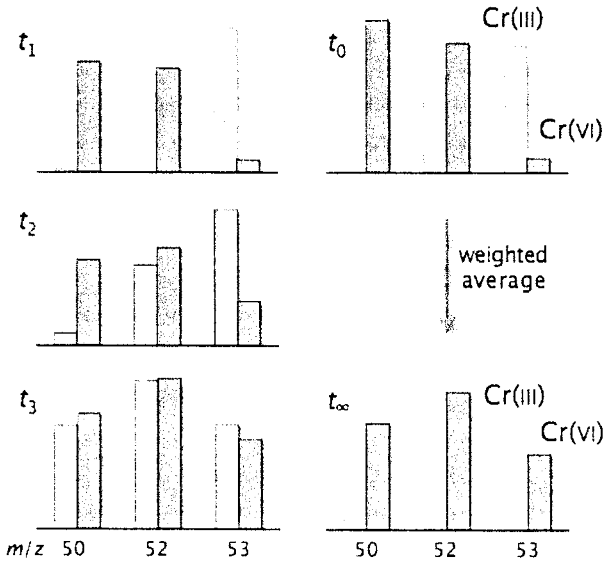
FIG. 6 depicts effects on the resulting isotope patterns of Cr(III) and Cr(VI) upon the repeated oxidation and reduction of these substances (i.e. from $t_0$ to $t_3$)

The (fully) scrambled state is entirely determined by the initial isotope patterns of both species and their relative amount. Simple experiment demonstrates the notion of isotope pattern scrambling in elemental speciation analysis (see FIG. 6).

Loss of Information Upon Scrambling

Figure 7:
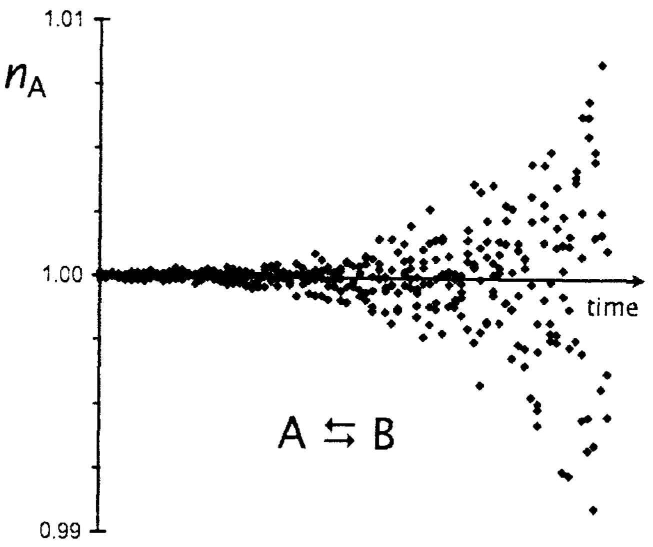
FIG. 7 depicts a Monte-Carlo simulation of the increase in the relative uncertainty (y-axis) of double-spiking isotope dilution results, i.e. amount of compound A, as a function of inter-conversion time (x-axis) showing that inter-conversion of analytes can be corrected using multiple-spiking isotope dilution at the expense of the precision of initial amount estimates; and, FIG. 8 depicts a graph showing anticipated error magnification factor for estimated analyte amounts from species-specific double-spiking isotope dilution depending of initial amount ratio and correction factors for the analyte interconversion, where both analytes are spiked in a 1:1 analyte-to-spike amount ratio.

As a result of the isotopic scrambling, both compounds A and B will eventually attain identical isotopic signatures regardless their initial amounts or inter-conversion rate constants. After addition of enriched spikes to the sample, the resulting isotope patterns of all analytes is amount-weighted linear combination of their sources, much like in Eq. [51]. In multiple spiking, however, in addition to the initial amount of m analytes, m(m−1) degrees of inter-conversion are also unknown. Multiple-spiking isotope dilution experiment, i.e. the observed isotope patterns of all m analytes (I), can be equated to the mass spectra of pure components (X) via the transformation matrix, A: I=X·A [Meija 2004]. The initial amounts of all m analytes and all m(m−1) degrees of conversion are obtained from the matrix A which has at least $m^2$ independent entries. This is enough to resolve amounts of m analytes and m(m−1) degrees of inter-conversion since $m+m(m-1)=m^2$. If, however, the observed isotope patterns of analytes are identical, so do the columns in the coefficient matrix A and the number of independent entries in the coefficient matrix A shrinks down to m. An obvious consequence of this is the inability to resolve the initial amounts of analytes if isotope patterns of the inter-converting substances become identical. As FIG. 7 illustrates, inter-conversion of analytes can be corrected using multiple-spiking isotope dilution at the expense of the precision of initial amount estimates.

This conclusion has important consequence in isotope dilution mass spectrometry. Since any transformation will equally affect the analytes and spikes, it is always possible to correct for species transformation from the information present and carried by the unique isotopic signatures of the spikes. However, if both species are involved in an inter-conversion process, this will ultimately result in identical isotope patterns for both analytes regardless of the initial amounts of both analytes and their isotope patterns (Eq. [58]). As mentioned above, estimation of species concentration from such system is impossible with isotope dilution.

Effect of the Inter-Conversion Degree

When using multiple spiking isotope dilution to quantify two inter-converting analytes, such as Cr(III) and Cr(VI), the United States Environmental Protection Agency (USEPA) has recommended that the sum of the degrees of inter-conversion should not exceed 80% for results to be trustworthy [USEPA 1998]. However, such heuristics does not take into account the common disparity between the amounts of both analytes. In systems with Cr(III)/Cr(VI) ratios larger than 100, as in yeast, it is clear that even the miniscule reduction of Cr(III) into a trace level Cr(VI) will greatly compromise the isotopic signature of the latter. It is an advantage of the present method that the sum of the inter-conversion factors need not be lower than 80%.

The relative uncertainty of the (analyte) amount estimate is larger than the uncertainty of the isotope ratio measurement by a factor of $f_0$:

$$u_r(n)=f_0 \cdot u_r(R) \quad [59]$$

In isotope dilution this is traditionally known as the error magnification factor [Riepe 1966; De Bièvre 1965]. In the presence of analyte inter-conversion, however, the relative uncertainty of the analyte is further increased due to the isotope scrambling. Depending on the relative amount of the two analytes, we now show that it is possible to simulate the impact of the degree of inter-conversion to the relative uncertainty of the obtained amount of analytes. To determine relative standard deviation of amounts obtained using) conventional isotope dilution [Meija 2007; Patterson 1994], Monte-Carlo modeling can be applied to multiple-spiking isotope dilution model to study the effect of species inter-conversion to the uncertainty magnification factors of the obtained amount estimates. Fundamentals of random error propagation by the Monte Carlo simulations can be found elsewhere [Patterson 1994; Schwartz 1975]. In short, simulations can be carried out at various degrees of conversion and analyte ratios by repeating calculations with randomly varying isotopic signal intensities (within 0.1-2.0% of their nominal values). The obtained array of the analyte amounts enables the estimation of their relative uncertainties. Mathcad™ software (v. 12.0a; Mathsoft Engineering & Educ., Inc.) can be used to perform these simulations and all calculations are made considering that the amount of the added spikes equals the amount of the corresponding analytes, i.e. $n(M_i)^{nat}/n(M_i)^{enr}=1$.

Keeping in tradition with the established error magnification factors, we introduce $f_{\leftrightarrows}$ to describe the increase of the relative uncertainty of the analyte amount estimate due to analyte inter-conversion process. The same can be achieved using additive uncertainty contributions rather than multiplicative factors. For example, $f_{\leftrightarrows}(M_2)$ is error magnification solely due to the inter-conversion of $M_1$ and $M_2$. Using the above error magnification notation, the relative uncertainty of $n(M_2)$ can be written as follows:

$$u_r(n)=f_{\leftrightarrows} f_0 \cdot u_r(R) \quad [60]$$

It is clear that $f_{\leftrightarrows}=1$ when no analyte inter-conversion occurs. The overall uncertainty of the multiple-spiking isotope dilution result depends mainly on the initial amount ratio of) the inter-converting analytes and the degree of analyte formation:

$$f_{\leftrightarrows}(M_k) \approx 1 + \sum_{i=k}^{m} F_{i\to k} \frac{n_{M_i}}{n_{M_k}} \delta_{i\to k} \quad [61]$$

where $f_{\leftrightarrows}$ is the uncertainty magnification factor for the estimate of $n(M_k)$ due to the inter-conversion of species $M_1$-$M_m$, $F_{i\to k}$ is the inter-conversion amount correction factor (Table 3), and $\delta_{i\to k}$ is a somewhat complicated function of all amount correction factors:

$$\delta_{i\to k} = e^{F_{i\to k}F_{k\to i}}\left(1 + \frac{1}{2 - F_{i\to k} - F_{k\to i}}\right) \quad [62]$$

The above expression is akin to a Horwitz trumpet (Albert 1997, Horowitz 1982) for isotope dilution. If both $F_{i\to k}$ and $F_{k\to i}$ are small, e.g. less than 5-10%, as one would expect from an optimized analyte extraction protocol then $\delta \approx 1.25$ and we obtain a rather simple error magnification heuristics for species inter-conversion. While three component systems are known in analytical practice, two component systems are more widespread. For a two-component system the trends can be summarized in a Horwitz trumpet-like expression (FIG. 8) showing the anticipated relative uncertainty of the multiple spiking isotope dilution results depending on the ratio of the inter-converting analytes and their inter-conversion amount correction factors, $F_{1\rightarrow 2}$ and $F_{2\rightarrow 1}$.

Figure 8:
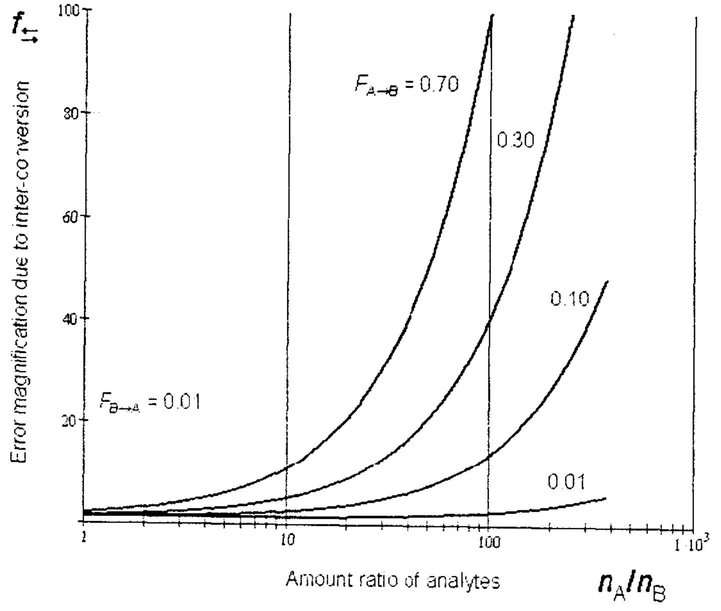

From Eq. [61] or FIG. 8 one can observe that a thousand-fold amount ratio of the two inter-converting species means that the degree of conversion of the major species into the minor substance cannot exceed 0.2% to achieve precise (less than 10%) amount estimate of the minor component. In fact, for a thousand-fold amount ratio of both analytes, 3% degree of conversion from major to minor analyte results in 50% relative uncertainty of the minor analyte concentration estimate if the isotope ratios are measured with 1% precision. Such analyte ratios are common both in Cr(III)/Cr(VI) in yeast and Hg(II)/$CH_3Hg^+$ in sea sediments [Rodríguez Martín-Doimeadios 2003]. In accord with the above uncertainty analysis, Monperrus et al. recently have commented on the extreme experimental difficulties to acquire precise $CH_3Hg^+$ amounts at low $CH_3Hg^+$/Hg(II) amount ratios, i.e. <0.05 [Monperrus 2008].

The utility of Eq. [61] can be demonstrated from the two different Cr(III)/Cr(VI) determination methods. For yeast, with the Cr(III) and Cr(VI) ratio of 25:1, Yang et al. report the following relative uncertainties of Cr(III) and Cr(VI) [Yang 2006]: $u_{r,Cr(III)}$=5.3% and $u_{r,Cr(VI)}$=60%. Degrees of oxidation and reduction are 0.24 and 0.38, respectively (n=3, k=1). The observed error magnification factor $f_{\leftrightarrows}$(Cr(VI))=0.63/0.053≈12 and is comparable to the prediction from Eq. [61] which gives $f_{\leftrightarrows}$(Cr(VI))≈17, a rather close match considering the large experimental uncertainty. Likewise, an improvement of this method with the degrees of oxidation and reduction 0.003 and 0.000, respectively, results in relative uncertainties of Cr(III) and Cr(VI) of 3.3% and 15%, respectively, for mass ratio of Cr(III)/Cr(VI)=580.1. In the present improved method, Eq. [61] gives $f_{\leftrightarrows}$(Cr(VI))≈4.0, again, in good agreement with the observed error magnification factor 0.15/0.033=4.5.

A similar approach can be used to assess the uncertainty of the measurements for species that are degraded sequentially as observed with butyltin [Ruiz Encinar 2002; Rodríguez-González 2004] or phenyltin [Van 2008] compounds. For a unidirectional two-component degradation, A→B, one simply has to substitute $\alpha_{B\rightarrow A}=0$ in Eq. [61].

Detection Limits

Equation [61] can be used to estimate the isotope ratio measurement precision needed to ensure detection of the analyte in spite of its inter-conversion. According to the conventional definition of the detection limit, relative uncertainty at the detection limit is ~66%. This is evident from the standard definition of detection limit, i.e. 3s. Since u=2s, $u_r(n)=2/3$ at the classical detection limit. Since the uncertainty of the analyte amount must be lower than this critical value, Eq. [60] can be turned into the following uncertainty principle:

$$f_{\leftrightarrows} f_0 \cdot u_r(R) \le 2/3 \qquad [63]$$

Since $f_0 \approx 2$, ranging from 1.62 (m=2) to 2.43 (m=3), in a two-component system we can estimate the highest permissible uncertainty of the isotope ratio measurement for successful detection of $M_2$ by combining Eqs. [61] and [63]:

$$u_r(R) \le \frac{1}{3 \cdot F_{1\rightarrow 2}\delta_{1\rightarrow 2}} \cdot \frac{n_{M_2}}{n_{M_1}} \qquad [64]$$

For example, when $n_{Hg(II)}/n_{MeHg} \approx 100$ and $F_{Hg(II)\rightarrow MeHg}$=40-80%, $F_{MeHg\rightarrow Hg(II)}$=0.1-0.3%, as recently reported for $CH_3Hg^+$ determination in sea sediments [Monperrus 2008], Eq. [64] gives $u_r(R) \le 0.2\%$. Since quadrupole ICP-MS cannot attain isotope ratios with precision much lower than this, large relative uncertainties are expected for the mass fraction of $CH_3Hg^+$, in accord with the observed relative uncertainties of up to 40% [Monperrus 2008]. Owing to the high isotope ratio measurement precision in sector-field, multi-collector or time-of-flight ICP-MS platforms, the uncertainty of the isotope dilution results can decrease drastically compared to the results obtained by quadrupole. In this vein, higher analyte inter-conversion can be tolerated when high precision isotope ratio determination is employed.

Owing to the ability of multiple-spiking isotope dilution to correct for any inter-conversion, less effort can be spent at minimizing analyte inter-conversion during the sampling, extraction and analysis protocols. Yet, following an underlying uncertainty principle, such corrections come at the expense of the uncertainty of the obtained results: less effort towards maintaining low species inter-conversion results in larger analyte amount uncertainty and vice versa. We have derived an equation that can serve as a practical tool to assess the additional increase in uncertainty due to inter-conversion of the analytes, both a priori for analytical method development and a posteriori to evaluate the obtained results.

REFERENCES

The contents of the entirety of each of which are incorporated by this reference.

Albert R, Horwitz W. (1997) *Analytical Chemistry.* 69: 789-790.

Biemann K. (1962) *Mass Spectrometry: Organic Chemical Applications*. McGraw-Hill.

Bijlsma S, Boelens H F M, Hoefsloot H C J, Smilde A K. (2000) *Analytica Chimica Acta.* 419: 197-207.

Blanchard P, Devaney R L, Hall G R. (2006) 'Differential Equations', 3rd ed. Thomson Brooks/Cole: Belmont, USA.

Boyd R K. (1977) *Chem. Rev.* 77: 93.

Branson H. (1947) *Science.* 106: 404-404.

Brauman J I. (1966) *Analytical Chemistry.* 38: 607-610.

Cornfield J, Steinfeld J, Greenhouse S W. (1960) *Biometrics.* 212-234.

De Bièvre P, Debus G H. (1965) *Nuclear Instruments and Methods.* 32: 224-228.

Di H J, Cameron K C, McLaren R G. (2000) *Aust. J. Soil Res.* 38: 213-230.

Dumon A, Lichanot A, Poquet E. (1993) *J. Chem. Educ.* 70: 29.

Eckley C S, Hintelmann H. (2006) *Sci. Tot. Environ.* 368: 111.

*Federal Register*. (2008) 73: 486-489.

Gonfiantini R, Valkiers S, Taylor P D P, De Bièvre P. (1997) *International Journal of Mass Spectrometry and Ion Processes.* 161: 15-26.

Heumann K G, Gallus S M, Rädlinger G, Vogl J. (1998) *Spectrochimica Acta Part B—Atomic Spectroscopy.* 53: 273-287.

Hintelmann H, Evans R D, Villeneuve J Y. (1995) *J. Anal. At. Spectrom.* 10: 619.

Hintelmann H, Falter R, Ilgen G, Evans R D. (1997) *Fres. J. Anal. Chem.* 358: 363-370.

Hintelmann H. (1999) *Chemosphere.* 39: 1093.
Hoelzl R, Hoelzl C, Kotz C, Fabry L. (1998) *Accreditation and Quality Assurance.* 3: 185-188.
Horwitz W. (1982) *Analytical Chemistry.* 54: 67A-76A.
International Organization for Standardization. (1993) 'International Vocabulary of Basic and General Terms in Metrology'.
'IUPAC Compendium of Chemical Terminology, electronic version (http://goldbook.iupac.org)'.
Jennings M E I, Matthews D E. (2005) *Analytical Chemistry.* 77: 6435-6444.
Jereb V, Horvat M, Drobne D, Pihlar B. (2003) *Sci. Tot. Environ.* 304: 269.
Kingston H M. (1995) U.S. Pat. No. 5,414,259.
Kingston H M, Huo D, Lu Y, Chalk S. (1998) *Spectrochim. Acta B.* 53: 299-309.
Kingston H M. (2004) U.S. Pat. No. 6,790,673.
Kragten J. (1994) *The Analyst.* 119: 2161-2165.
Laidler K J. (1996) *Pure Appl. Chem.* 68: 149.
Lambertsson L, Lundberg E, Nilsson M, Frech W. (2001) *J. Anal. At. Spectrom.* 16: 1296.
Lawson C L, Hanson R J. (1974) *Solving Least Squares Problems.* Prentice Hall: Englewood Cliffs N.J.
Meija J, Caruso J A. (2004) *Journal of the American Society for Mass Spectrometry.* 15: 654-658.
Meija J, Centineo G, Garcia Alonso J I, Sanz-Medel A, Caruso J A. (2005) *Journal of Mass Spectrometry.* 40: 807-814.
Meija J, Yang L, Caruso J A, Mester Z. (2006a) *J. Anal. At. Spectrom.* 21: 1294-1297.
Meija J, Mester Z, D'Ulivo A. (2006b) *Journal of the American Society for Mass Spectrometry.* 17: 1028-1036.
Meija J, Mester Z. (2007) *Spectrochimica Acta B.* 62: 1278-1284.
Meija J, Mester Z. (2008a) *Anal. Chim. Acta.* 607: 115-125.
Meija J, Mester Z. (2008b) *Metrologia.* 45: 53-62.
Monperrus M, Tessier E, Amouroux D, Leynaert A, Huonnic P, Donard O F X. (2007) *Mar. Chem.,* 107: 49-63.
Monperrus M, Rodríguez-González P, Amouroux D, Garcia Alonso J I, Donard O F X. (2008) *Anal. Bioanal. Chem.* 390: 655-666.
Patterson K Y, Veillon C, O'Haver T C. (1994) *Analytical Chemistry.* 66: 2829-2834.
Point D, Davis W C, Garcia Alonso J I, Monperrus M, Christopher S J, Donard O F X, Becker P R, Wise S A. (2007) *Anal. Bioanal. Chem.* 389: 787-798.
Point D, Garcia Alonso J I, Davis W C, Christopher S J, Guichard A, Donard O F X, Becker P R, Turk G C, Wise S A. (2008) *J. Anal. At. Spectrom.* 23: 385.
Qvarnström J, Frech W. (2002) *J. Anal. At. Spectrom.* 17: 1486.
Rahman G M M, Kingston H M. (2004) *Anal. Chem.* 76: 3548.
Riepe W, Kaiser H. (1966) *Fresenius Zeitschrift der Analytische Chemie.* 223: 321-335.
Rodríguez-Castrillón J Á, Moldovan M, Ruiz Encinar J, García Alonso J I. (2008) *Journal of Analytical Atomic Spectrometry.* 23: 318-324.
Rodríguez-González P, Ruiz Encinar J, Garcia Alonso J I, Sanz-Medel A. (2004) *J. Anal. At. Spectrom.* 19: 685-691.
Rodríguez-González P, Ruiz Encinar J, García Alonso J I, Sanz-Medel A. (2005a) *Anal. Bioanal. Chem.* 381: 380.
Rodríguez-González P, Marchante-Gayón J M, Garcia Alonso J I, Sanz-Medel A. (2005b) *Spectrochimica Acta B.* 60: 151-207.
Rodríguez-González P, Garcia Alonso J I, Sanz-Medel A. (2005c) *Journal of Analytical Atomic Spectrometry.* 20: 1076-1084.
Rodríguez-González P, Monperrus M, García Alonso J I, Amouroux S, Donard O F X. (2007) *J. Anal. At. Spectrom.* 11: 1373-1382.
Rodríguez Martín-Doimeadios R C, Monperrus M, Krupp E, Amouroux D, Donard O F. (2003) *Analytical Chemistry.* 75: 3202-3211.
Rodríguez Martín-Doimeadios R C, Tessier E, Amouroux D, Guyoneaud R, Duran R, Caumette P, Donard O F X. (2004) *Mar. Chem.* 90: 107.
Ruiz Encinar J, Rodríguez-González P, García Alonso J I, Sanz-Medel A. (2002) *Analytical Chemistry.* 74: 270-281.
Schwartz L M. (1975) *Analytical Chemistry.* 47: 963-964.
Tirez K, Brusten W, Cluyts A, Patyn J, De Brucker N. (2003) *Journal of Analytical Atomic Spectrometry.* 18: 922-932.
USEPA. (1998) 'Method 6800: Elemental and Speciated Isotope Dilution Mass Spectrometry'.
USEPA. (2007) 'Method 6800: Elemental and Speciated Isotope Dilution Mass Spectrometry'.
Van D N, Bui T T X, Tesfalidet S. (2008) *Analytical and Bioanalytical Chemistry.* online.
Welch S A, Beard B L, Johnson C M, Braterman P S. (2003) *Geochimica et Cosmochimica Acta.* 67: 4231-4250.
Yang L, Ciceri E, Mester Z, Sturgeon R E. (2006) *Analytical and Bioanalytical Chemistry.* 386: 1673-1680.
Yang L, Sturgeon R E. (2008) *Analytical and Bioanalytical Chemistry.* online.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A method of multiple spiking isotope dilution mass spectrometry comprising:
- obtaining a mass spectrum of a chemical system having two or more inter-converting analytes of interest, the chemical system having been spiked with known amounts of isotopes of the analytes;
- determining systematic instrument biases corrected values of a mass spectrometric parameter of the analytes from the mass spectrum of the spiked chemical system;
- determining pure component contribution coefficients for each analyte in the mass spectrum by mathematically deconvoluting the corrected values of the mass spectrometric parameter using pure component mass spectra of the analytes, wherein deconvolution is performed according to a matrix expression relating the corrected values of the mass spectrometric parameter to a linear combination of the pure component mass spectra and the pure component contribution coefficients for each analyte;
- determining a property of one or more of the analytes in the chemical system from the pure component contribution coefficients determined for each analyte; and,
- estimating uncertainty in the property including estimating an increase in the uncertainty due to inter-conversion of the analytes.

2. The method according to claim 1, wherein estimating the increase in the uncertainty comprises estimating an increase in uncertainty of amount of analytes.

3. The method according to claim 2, wherein the increase in uncertainty of the amount of analyte is estimated from initial amount ratios of the two or more inter-converting analytes and degree of analyte formation and degradation.

4. The method according to claim 3, wherein the increase in uncertainty of the amount of analytes is determined by:

$$f_{\leftrightarrows}(M_k) \approx 1 + \sum_{i=k}^{m} F_{i\to k} \frac{n_{M_i}}{n_{M_k}} \delta_{i\to k} \quad [61]$$

wherein $f_{\leftrightarrows}$ is increase in uncertainty of amount of analyte $M_k$ due to inter-conversion of species $M_1$-$M_m$, $n_{Mi}$ is initial amount of analyte $M_i$, $n_{Mk}$ is initial amount of analyte $M_k$, $F_{i\to k}$ is inter-conversion amount correction factor for inter-conversion of $M_i$ to $M_k$, and $\delta_{i\to k}$ is:

$$\delta_{i\to k} = e^{F_{i\to k}F_{k\to i}}\left(1 + \frac{1}{2 - F_{i\to k} - F_{k\to i}}\right) \quad [62]$$

wherein $F_{i\to k}$ is inter-conversion amount correction factor for interconversion of $M_i$ to $M_k$ and $F_{k\to i}$ is inter-conversion amount correction factor for interconversion of $M_k$ to $M_i$.

5. The method according to claim 1, wherein the mass spectrometric parameter comprises one or more of a mass spectrometric signal intensity, isotope abundance or isotope ratio.

6. The method according to claim 1, wherein the mass spectrometric parameter is one or more isotope ratios.

7. The method according to claim 3, wherein the matrix expression relates isotope ratios (R) to pure component mass spectra (X) and pure component contribution coefficients (A) using Eq. 28:

$$\begin{pmatrix} R_{1,1} & \dots & R_{1,m} \\ R_{2,1} & \dots & R_{2,m} \\ \dots & \dots & \dots \\ R_{p,1} & \dots & R_{p,m} \end{pmatrix} = \begin{pmatrix} x^*_{1,1} & \dots & x^*_{1,m} & x^{nat}_{1,m+1} & \dots & x^{nat}_{1,m+q} \\ x^*_{2,1} & \dots & x^*_{2,m} & x^{nat}_{2,m+1} & \dots & x^{nat}_{2,m+q} \\ \dots & \dots & \dots & \dots & \dots & \dots \\ x^*_{p,1} & \dots & x^*_{p,m} & x^{nat}_{p,m+1} & \dots & x^{nat}_{p,m+q} \end{pmatrix} \cdot \begin{pmatrix} a_{1,1} & \dots & a_{1,m} \\ a_{2,1} & \dots & a_{2,m} \\ \dots & \dots & \dots \\ a_{m+q,1} & \dots & a_{m+q,m} \end{pmatrix}. \quad [28]$$

8. The method according to claim 1, wherein the property comprises an amount (n), a degree of conversion (α), a rate constant (k), an extent of conversion (ξ) or any combination thereof.

9. The method according to claim 1, wherein the systematic instrument biases comprise mass-bias, uneven signal suppression, detector dead-time or any combination thereof.

10. A non-transitory computer-readable medium comprising computer code for execution of a method as defined in claim 1.

11. The computer-readable medium according to claim 10 comprising a hard drive, a memory stick, a CD, a DVD or a floppy diskette.

12. The computer-readable medium according to claim 10 associated with a mass spectrometer.

* * * * *